United States Patent
Dobrzynski et al.

(10) Patent No.: US 12,288,267 B2
(45) Date of Patent: Apr. 29, 2025

(54) TRANSACTIVE FRAMEWORK FOR ELECTRIC VEHICLE CHARGING CAPACITY DISTRIBUTION

(71) Applicant: UCHICAGO ARGONNE, LLC, Chicago, IL (US)

(72) Inventors: Daniel S. Dobrzynski, Forest Park, IL (US); Jason D. Harper, Plainfield, IL (US)

(73) Assignee: UCHICAGO ARGONNE, LLC, Chicago, IL (US)

( * ) Notice: Subject to any disclaimer, the term of this patent is extended or adjusted under 35 U.S.C. 154(b) by 84 days.

(21) Appl. No.: 16/863,958

(22) Filed: Apr. 30, 2020

(65) Prior Publication Data
US 2021/0342958 A1 Nov. 4, 2021

(51) Int. Cl.
*G06Q 50/06* (2024.01)
*B60L 53/62* (2019.01)
(Continued)

(52) U.S. Cl.
CPC ........... *G06Q 50/06* (2013.01); *B60L 53/62* (2019.02); *B60L 53/665* (2019.02);
(Continued)

(58) Field of Classification Search
CPC ........... G06Q 50/06; G06Q 10/06312; G06Q 20/145; G06Q 30/0234; G06Q 30/08
(Continued)

(56) References Cited

U.S. PATENT DOCUMENTS 7,343,360 B1 * 3/2008 Ristanovic ............. G06Q 50/06
    705/412
8,154,246 B1 * 4/2012 Heitmann ............. B60L 53/305
    320/155
(Continued)

FOREIGN PATENT DOCUMENTS

JP       2012-221496 A    11/2012

OTHER PUBLICATIONS

Xiao Cheng, "Ordered Electric Vehicles Charging Scheduling Algorithm Based on Bidding in Residential Area" Jan. 16, 2020, MDPI, pp. 1-11. (Year: 2020).*
Black, et al., "Los Angeles Air Force Base Vehicle-to-Grid Demonstration," California Energy Commission Report No. CEC-500-2018-025, 52 pages (2018).
California ISO, "2018 Annual Report on Market Issues and Performance," retrieved from http://www.caiso.com/Documents/2018AnnualReportonMarketIssuesandPerformance.pdf, 142 pages (2019).
(Continued)

*Primary Examiner* — George Chen
*Assistant Examiner* — Duane N. Moore
(74) *Attorney, Agent, or Firm* — Foley & Lardner LLP

(57) ABSTRACT

A charging management system includes a network interface, a memory, and a processing circuit including a processor. The processing circuit is configured to determine monetary information related to an energy price, determine an electrical vehicle (EV) power limit $P_{LIM}$ for a total amount of EVs in an EV charging network, transmit the monetary information to two or more agents, each of the two or more agents associated with an EV in the EV charging network, receive, from each of the two or more agents, a bid including: an agent monetary value, a desired charging rate $P_D$, and a charging interval, and allow the EVs associated with the two or more agents to be charged based on each of the bids.

16 Claims, 16 Drawing Sheets

(51) Int. Cl.
  *B60L 53/66* (2019.01)
  *G06Q 10/0631* (2023.01)
  *G06Q 20/14* (2012.01)
  *G06Q 30/0234* (2023.01)
  *G06Q 30/08* (2012.01)
  *G06Q 40/04* (2012.01)
  *H02J 7/00* (2006.01)

(52) U.S. Cl.
  CPC ..... *G06Q 10/06312* (2013.01); *G06Q 20/145* (2013.01); *G06Q 30/0234* (2013.01); *G06Q 30/08* (2013.01); *G06Q 40/04* (2013.01); *H02J 7/007* (2013.01)

(58) Field of Classification Search
  USPC ..... 705/7.35, 7.22, 40, 14.34, 14.71; 701/22
  See application file for complete search history.

(56) References Cited

U.S. PATENT DOCUMENTS

| | | | |
|---|---|---|---|
| 8,594,859 | B2 | 11/2013 | Contreras Delpiano |
| 9,758,046 | B2 | 9/2017 | Harper et al. |
| 9,944,194 | B1* | 4/2018 | Brooks .................. G06Q 50/06 |
| 2010/0049639 | A1 | 2/2010 | Ferro et al. |
| 2011/0278920 | A1* | 11/2011 | Sakamoto ................ B60L 1/00 705/7.35 |
| 2012/0296794 | A1 | 11/2012 | Boot et al. |
| 2013/0184882 | A1* | 7/2013 | Momose ................ B60L 53/68 700/286 |
| 2014/0172503 | A1 | 6/2014 | Hammerstrom et al. |
| 2016/0370806 | A1* | 12/2016 | North .................... G05D 1/0291 320/109 |
| 2017/0246962 | A1* | 8/2017 | Weber .................... B60L 53/12 320/107 |
| 2019/0039467 | A1* | 2/2019 | Hortop .................. B60L 53/64 320/109 |
| 2019/0225091 | A1* | 7/2019 | Wheatley ............... B60L 53/14 307/9.1 |
| 2021/0061121 | A1* | 3/2021 | Light-Holets ........... B60L 1/00 705/7.35 |
| 2021/0323431 | A1* | 10/2021 | Potter .................... B60L 53/63 320/109 |

OTHER PUBLICATIONS

Deforest, et al., "Day ahead optimization of an electric vehicle fleet providing ancillary services in the Los Angeles Air Force Base vehicle-to-grid demonstration," Applied Energy 210, pp. 987-1001 (2018).

Hammerstorm, et al., "Valuation of Transactive Systems: Final Report," U.S. Department of Energy Report No. PNNL-25323, 198 pages (2016).

Hammerstrom & Pratt, "Electric Vehicle Charging Decisions using Only Market Trends with Persistence," Proceedings of the 53rd Hawaii International Conference on System Sciences, pp. 2951-2960 (2020).

Hammerstrom, et al., "Pacific Northwest Smart Grid Demonstration Project Technology Performance Report. Volume 1: Technology Performance," U.S. Department of Energy Report No. PNWD-4438, 418 pages (2015).

Heidloff, "What is Node-RED? How can it be used for the Internet of Things?," retrieved from http://heidloff.net/article/21.01.2015081841NHEAL8.htm, 2 pages (2015).

Homeplug Powerline Alliance, Inc., " Home Plug Green PHY the Standard for In-Home Smart Grid Powerline Communications," HomePlug Green PHY Whitepaper, 17 pages (2010).

Lian, et al., "Transactive System: Part II: Analysis of Two Pilot Transactive Systems using Foundational Theory and Metrics," U.S. Department of Energy Report No. PNNL-27235 Part II, 48 pages (2017).

Markel, et al., "Multi-Lab EV Smart Grid Integration Requirements Study. Providing Guidance on Technology Development and Demonstration," U.S. Department of Energy Report No. NREL/TP-5400-63963, 91 pages (2015).

Piette, et al., ". Costs to Automate Demand Response—Taxonomy and Results from Field Studies and Programs," California Energy Commission Report No. LBNL-1003924, 45 pages (2015).

Somasundaram, et al., "Transaction-Based Building Controls Framework, vol. 1: Reference Guide," U.S. Department of Energy Report No. PNNL-23302, 70 pages (2014).

* cited by examiner

TRANSACTIVE FRAMEWORK FOR ELECTRIC VEHICLE CHARGING CAPACITY DISTRIBUTION

GOVERNMENT SUPPORT CLAUSE

This invention was made with government support under Contract No. DE-AC02-06CH11357 awarded by the United States Department of Energy to UChicago Argonne, LLC, operator of Argonne National Laboratory. The government has certain rights in the invention.

TECHNICAL FIELD

The present disclosure relates generally to managing charging of electric vehicles.

BACKGROUND

Electric vehicles (EV) are becoming increasingly common in the consumer market. As usage of EVs increases, EV charging plazas will be added to areas such as residential buildings, workplaces, and large parking structures or lots. EV charging plazas are analogous to gas stations, where gas stations have gas pumps, EV charging plazas deploy multiple charge stations or Electric Vehicle Supply Equipment (EVSE). A charge station or EVSE can have multiple ports. A single port charges a single EV. During times of high charging demand, an aggregate amount of power demanded by the EVs may be more than the infrastructure at the charging plaza and/or more than the local electric utility can provide. Under such conditions, the charging plaza may enact a charge curtailment strategy to delegate the available power to one or more EVs drawing electric power from the charging plaza. While these charge curtailment strategies endeavor to allocate the power adequately between the EVs in a manner that is fair to all of the EVSEs drawing electric power form the charging plaza, the charge curtailment strategies do not consider the owners' urgency in having the EVs charged.

SUMMARY

Arrangements described herein relate generally to systems and methods for allocating an available charging power between multiple EVs coupled to an EV charging site, and in particular, to systems and methods for allocating the available charging power between the multiple EVs coupled to an EV charging site based on a charging urgency of the users of the EVs and bids received therefrom. The EV charging site may be a part of distributed EV charging network.

In some arrangements, a charging management system includes a network interface, a memory, and a processing circuit. The network interface is configured to facilitate data communication via a network. The processing circuit includes a processor. The processing circuit is configured to determine monetary information related to an energy price. The processing circuit is configured to determine an electric vehicle (EV) power limit $P_{LIM}$ for a total amount of EVs in an EV charging network. The processing circuit is configured to transmit the monetary information to two or more agents, each of the two or more agents associated with an EV in the EV charging network. The processing circuit is configured to receive, from each of the two or more agents, a bid including: an agent monetary value, a desired charging rate $P_D$, and a charging interval. The processing circuit is configured to allow the EVs associated with the two or more agents to be charged based on each of the bids.

In some arrangements, an agent associated with an electric vehicle (EV) includes a network interface, a memory, and a processing circuit. The network interface is configured to facilitate data communication via a network. The processing circuit includes a processor. The processing circuit is configured to receive pricing information for a charging interval from a charging management system. The pricing information includes information indicative of one or more of a predicted price $\lambda_{pred}$. The processing circuit is configured to receive, via a user interface, information indicative of a charging urgency from a user. The processing circuit is configured to determine an urgency value k based on the information indicative of the charging urgency. The processing circuit is configured to determine a desired charging rate $P_D$ for the EV. The processing circuit is configured to determine, based on the desired charging rate $P_D$, a bid power $P_{bid}$ for a charging interval. The processing circuit is configured to determine, based on the pricing information and the urgency value k, an agent monetary value for power during the charging interval. The processing circuit is configured to transmit a bid including: a charge interval start and stop time, the agent monetary value, and the desired charging rate $P_D$ to the charging management system.

In some arrangements, a method of allocating charging power amongst two or more electric vehicles (EVs) includes determining, by a processing circuit of a charging management system, monetary information related to an energy price. The method includes determining, by the processing circuit, an EV power limit $P_{LIM}$ for a total amount of EVs in an EV charging network. The method includes transmitting, by the processing circuit, the monetary information to two or more agents, each of the two or more agents associated with one of the two or more EVs in the EV charging network. The method includes receiving, by the processing circuit, from each of the two or more agents, a bid including: an agent monetary value, a desired charging rate $P_D$, and a charging interval. The method includes causing, by the processing circuit, the EVs associated with the two or more agents to be charged based on each of the bids.

It should be appreciated that all combinations of the foregoing concepts and additional concepts discussed in greater detail below (provided such concepts are not mutually inconsistent) are contemplated as being part of the subject matter disclosed herein. In particular, all combinations of claimed subject matter appearing at the end of this disclosure are contemplated as being part of the subject matter disclosed herein.

BRIEF DESCRIPTION OF DRAWINGS

The foregoing and other features of the present disclosure will become more fully apparent from the following description and appended claims, taken in conjunction with the accompanying drawings. Understanding that these drawings depict only several implementations in accordance with the disclosure and are therefore, not to be considered limiting of its scope, the disclosure will be described with additional specificity and detail through use of the accompanying drawings.

Figure 1:
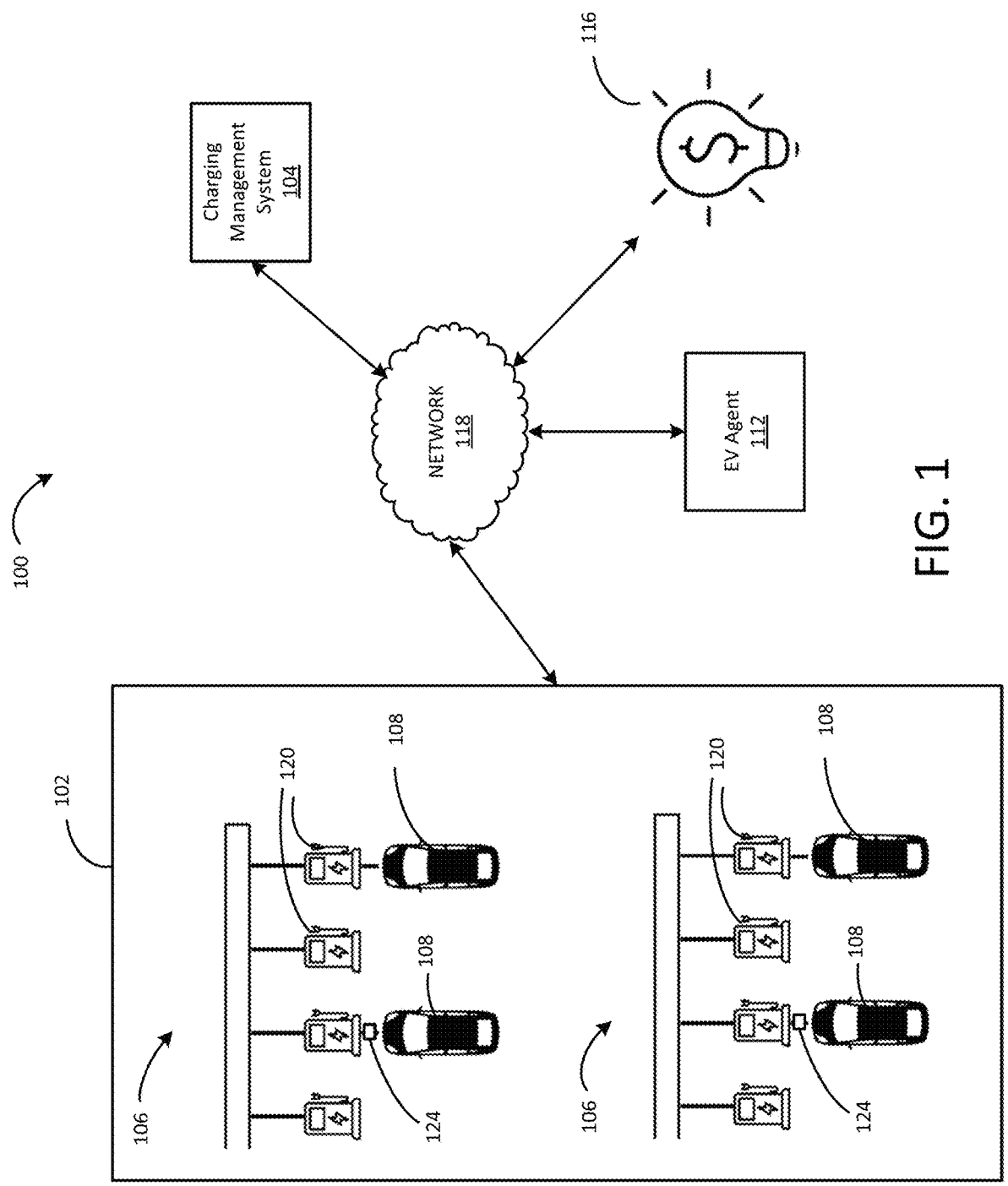
FIG. 1 is a diagram of a vehicle charging system for allocating an amount of charging power provided to a plurality of electric vehicles (EVs), according to some arrangements.

Reference is made to the accompanying drawings throughout the following detailed description. In the drawings, similar symbols typically identify similar components, unless context dictates otherwise. The illustrative implementations described in the detailed description, drawings, and claims are not meant to be limiting. Other implementations may be utilized, and other changes may be made, without departing from the spirit or scope of the subject matter presented here. It will be readily understood that the aspects of the present disclosure, as generally described herein and illustrated in the figures, can be arranged, substituted, combined, and designed in a wide variety of different configurations, all of which are explicitly contemplated and made part of this disclosure.

DETAILED DESCRIPTION OF VARIOUS ARRANGEMENTS

Arrangements described herein relate generally to systems and methods for allocating vehicle charging power between multiple EVs charging in a vehicle charging system, and in particular, systems and methods for allocating charging power between the EVs based on an urgency of a user of each of the EVs charging at charging site of the vehicle charging system. The vehicle charging sites may be part of a distributed EV charging network powered and controlled by a utility.

Groups of EVs may be charged simultaneously by individual EV charging ports in the EV charging network. During peak usage times, the vehicle charging system may not be able to meet the needs of all of the EVs attempting to receive electrical power from one or more charging sites. The charging sites may be part of a distributed EV charging network. The charging sites may include vehicle charging plazas, residential or commercial buildings including one or more EV charging ports, and/or parking facilities including one or more EV charging ports. Therefore, the charging management system may employ curtailment charging strategies to share the available power between the EVs connected to the individual EV ports in the EV charging network. For example, in some instances, the charging management system may divide the available charging power evenly amongst all of the vehicles charging in the EV charging network. In another instance, the charging management system may charge the EVs that arrive first at each EV charging station at an increased rate until these EVs are completely charged. The charging management system then allocates this charging capacity to the EVs vehicles connected to the EV charging ports of the EV charging network. In another instance, the charging management system charges the connected vehicles in a round-robin charging process in which the EVs take turns charging at maximum charging rates for short interval charging periods. In another instance, the charging management system may query the operators of the electric vehicles for the energy need and timing targets, and then allocate the power based on an optimization function.

However, none of the aforementioned charging strategies consider an urgency of the user of the EV to have the EV charged during a particular charging session, for example, a user's desire to get a vehicle charged within a particular time period. The urgency of the users of the EVs may vary from charging session to charging session. It would be advantageous to develop a charging strategy that takes this urgency into consideration in determining how to allocate available charging power across the EVs connected to the EV charging network.

Various arrangements of the systems and methods described herein provide a charging management system and one or more EV agents that are each associated with a particular EV. The charging management system may control vehicle charging sites of the EV charging network to allocate the charging capacity of the EV charging network among EVs connected to the EV charging network based on bids submitted by the EV agents. Each of the bids may include an agent monetary value or bid price $\lambda_{bid}$ and a desired charging power rate $P_D$ for an upcoming charging interval.

For example, the charging management system determines monetary information related to an energy price. Determining monetary information may include receiving pricing information from a power pricing authority and/or setting an energy price. The pricing information may include but not limited to a predicted price $\lambda_{pred}$, a past price, a flat rate energy price, and so on. The charging management system determines an aggregate EV power limit $P_{LIM}$ which is the maximum total aggregate power of all charging EVs in the vehicle charging system. The charging management system transmits the pricing information to two or more agents each associated with one of the EVs connected to the EV charging network. The charging management system receives a bid from each of the agents. Each bid includes but not limited to an agent monetary value, such as a price $\lambda_{bid}$, and a desired charging rate $P_D$ for an upcoming charging interval. The charging management system charges the EVs associated with the agents based on each of the bids. In some arrangements, prior to charging the EVs, the charging management system may determine an aggregate power demand for the interval based on each of the bids and compare the aggregate power demand to the EV power limit $P_{LIM}$. The charging management system may charge EVs associated with the agents based on the comparison.

In some arrangements, the charging management system may determine that the comparison indicates that the aggregate power demand is less than the EV power limit $P_{LIM}$ of the EV charging network and provide power to each of the EVs according to the desired charging rate $P_D$ in the bid corresponding to each EV. The charging management system may determine that there is an excess amount of power to distribute and allocate the excess amount of power to each EV based on the price $\lambda_{bid}$ in the bid corresponding to each EV.

In other arrangements, the charging management system may determine that the comparison indicates that the aggregate power is greater than the EV power limit $P_{LIM}$ of all charging EVs connected to the EV charging network. The charging management system may determine a minimum charging rate Pain to provide to all of the EVs and charge all of the EVs according to the minimum charging rate $P_{min}$. The charging management system may determine that a remaining amount of charging capacity exists. The remaining charging capacity is a difference between the EV power limit $P_{LIM}$ and an amount of power required to charge each of the EVs according to the minimum charging rate $P_{min}$. The charging management system may allocate the remaining amount of charging capacity between the EVs based on the price $\lambda_{bid}$ in the bid corresponding to each EV. In some arrangements, the charging management system may determine an energy price for the power provided and bill all of the EVs the energy price.

In some arrangements, the charging management system may allocate the remaining amount of charging capacity so that the EV corresponding to the highest bid is charged before an EV with a next highest bid is charged. The charging management system may determine a first energy price for the power provided at the minimum charging rate Pain and determine a second energy price higher than the first energy price for the remaining amount of charging capacity provided to each EV. The charging management system may determine a rebate amount based on a difference between at a cost of the remaining amount of charging capacity at the second price and a cost of the remaining amount of charging capacity at the first price and allocate a portion of the rebate amount to each of the EVs that received less power than in the bids corresponding to those EVs.

FIG. 1 is a diagram of an example vehicle charging system 100 including an EV charging network 102 powered by an electricity provider or utility, a charging management system 104, a plurality of EVs 108, a plurality of EV agents 112, and a pricing authority 116 (e.g., the electricity provider or utility.) The EV charging network includes one or more charging sites 106 such as EV charging plazas, residential or commercial buildings including one or more EV charging ports, and/or parking facilities including one or more EV charging ports 120. The EV charging ports 120 may be individually controlled to provide a predefined amount of power to an EV 108 coupled to the EV charging port 120. An EV charging plaza 106 is used as an exemplary charging site herein, but the other types of charging sites described herein can be controlled in a similar manner. Each of the plurality of EVs 108 is communicatively coupled to one of the EV agents 112. The charging management system 104, the plurality of EV agents 112, and the pricing authority 116 are in communication over a communication network 118. A user of an EV 108 may drive the EV 108 to the EV charging plaza 106, couple the EV 108 to one of the EV charging ports 120, and use EV agent 112 to submit a charging bid to the charging management system 104.

Figure 2:
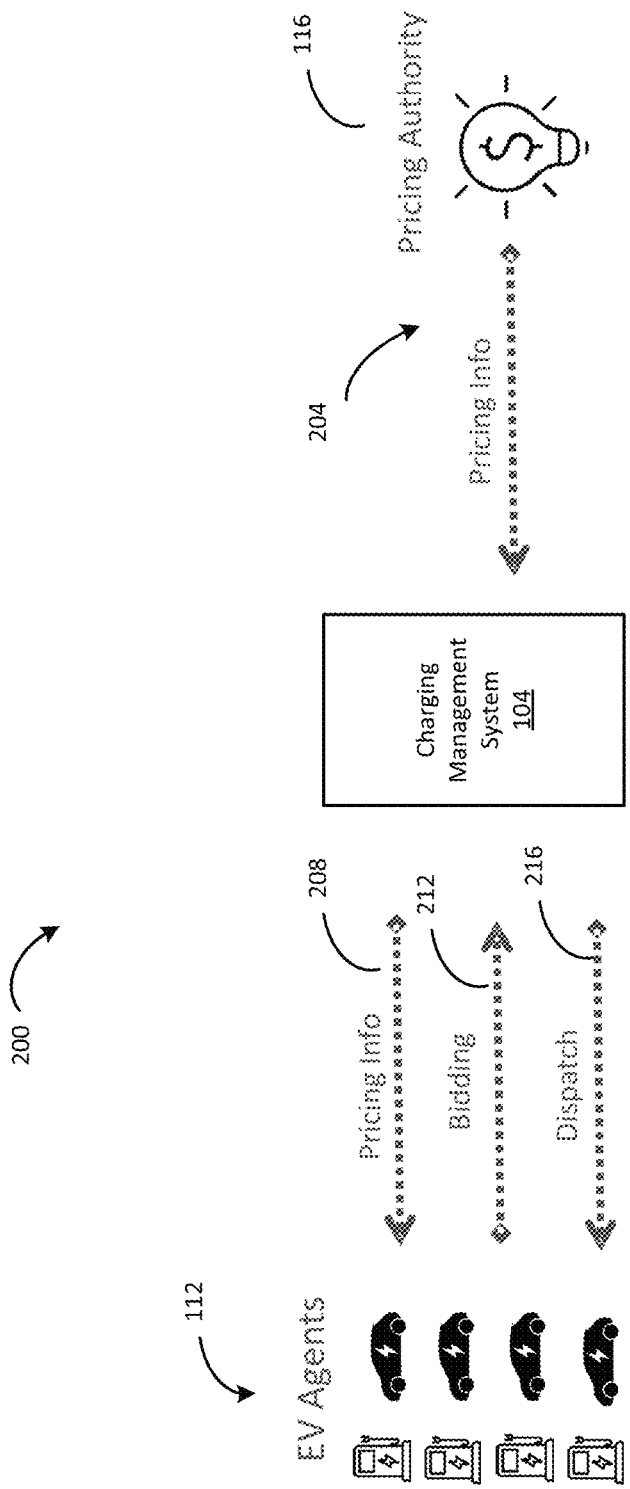
FIG. 2 is a diagram of a method for allocating the amount of charging power to the plurality of EVs via the system of FIG. 1, according to some arrangements.

As shown in FIG. 2, the charging management system 104 may determine monetary information related to energy price. For example, the charging management system 104 may receive pricing information from the pricing authority 116 at 204. The charging management system 104 may also receive power capacity information from a power provider, such as a utility. The charging management system 104 may transmit the monetary information related to the energy price to each of the EV agents 112, at 208. The EV agents 112 may transmit bids to the charging management system 104, at 212. The charging management system 104 may then determine an EV charging limit $P_{LIM}$ for the EV charging network 102, and allocate the charging power to each of the EVs 108 charging at the EV charging ports 120 of the EV charging network 102 based on the bids received from the EV agents 112, at 216.

The charging sites, such as the EV charging plaza 106, may be coupled to an electricity supply provided by the utility (distribution grid, transmission grid, etc.) and/or may be part of a larger distributed EV charging network, such as the EV charging network 102. The EV charging network 102 includes the plurality of EV charging plazas 106 with EV charging port 120 configured to engage battery charging inlets on the EVs 108, using the power provided by the utility. In some arrangements, a charge controller adapter 124 maybe be coupled the EV 108 and EV charging port 120 modify a control signal sent to the EV 108 to limit a max power draw of the EV 108.

The EVs 108 are vehicles in which an electrical motor is powered by an onboard battery. The EVs 108 include a charging inlet that can be coupled to the EV charging port 120 of the EV charging plaza 106 to charge the onboard battery using power provided by a utility. The EV 108 has an onboard computing system and a network interface. The onboard computing system is coupled to the onboard battery and is configured to determine information indicative of a state of the onboard battery and transmit the information indicative of the state of the onboard battery to the EV agent 112 over the communication network 118. Exemplary information indicative of the state of the onboard battery includes a state of charge (SOC) the battery, a total charge capacity of the battery, a remaining charge capacity of the battery, and so on.

The pricing authority 116 pay be an electric utility or another entity that has recent energy pricing information. The pricing authority 116 is configured to determine pricing information including past settled prices, past clearing prices, forecasted future prices, recent prices, and flat rate energy prices. The pricing authority 116 is configured to transmit the pricing information to the charging management system 104 over the communication network 118.

The communication network 118 is any suitable Local Area Network (LAN) or Wide Area Network (WAN). For example, the communication network 118 can be supported by Frequency Division Multiple Access (FDMA), Time Division Multiple Access (TDMA), Code Division Multiple Access (CDMA) (particularly, Evolution-Data Optimized (EVDO)), Universal Mobile Telecommunications Systems (UMTS) (particularly, Time Division Synchronous CDMA (TD-SCDMA or TDS) Wideband Code Division Multiple Access (WCDMA), Long Term Evolution (LTE), evolved Multimedia Broadcast Multicast Services (eMBMS), High-Speed Downlink Packet Access (HSDPA), and the like), Universal Terrestrial Radio Access (UTRA), Global System for Mobile Communications (GSM), Code Division Multiple Access 1× Radio Transmission Technology (1×), General Packet Radio Service (GPRS), Personal Communications Service (PCS), 802.11X, ZigBee, Bluetooth, Wi-Fi, any suitable wired network, combination thereof, and/or the like. The communication network 118 is configured to permit the exchange of data, values, instructions, messages, and the like between the EVs 108, the EV agents 112, the charging management system 104, and the pricing authority 116.

Figure 3:
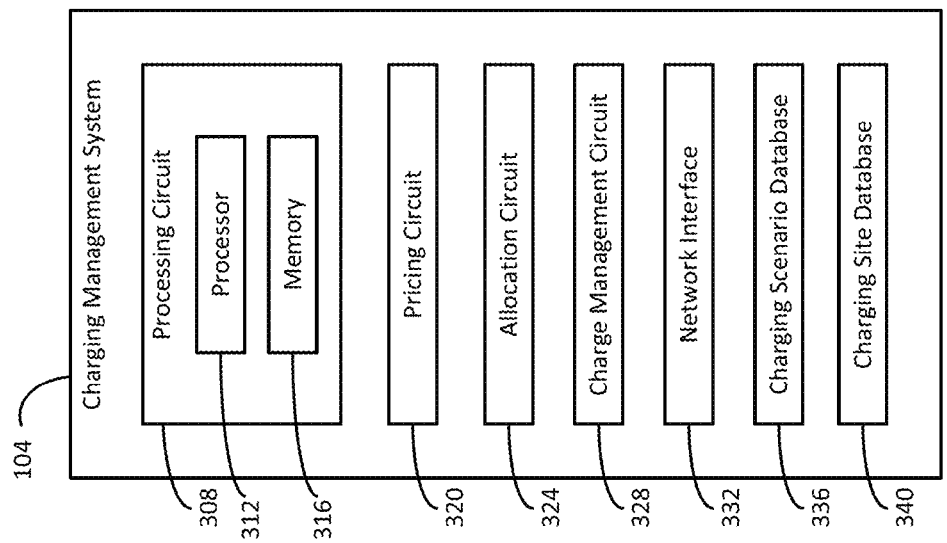
FIG. 3 is a schematic block diagram of a charging management system of the system of FIG. 1, according to some arrangements.

FIG. 3 is a diagram of an example of the charging management system 104 of the system 100 as set forth in FIG. 1 according to some arrangements. The charging management system 104 is associated with a single or plurality of charging sites such as residential or commercial buildings, parking facilities, a dedicated charging plaza, and so on that include charging sites including two or more EV charging port 120 configured to engage a battery charging inlet of the EVs 108. In embodiments with a plurality of charging sites, the charging sites may be part of a distributed EV charging network, such as the EV charging network 102.

The charging management system 104 includes a processing circuit 308 including a processor 312 and a memory device 316. The processor 312 is implemented as a general-purpose processor, an Application Specific Integrated Circuit (ASIC), one or more Field Programmable Gate Arrays (FPGAs), a Digital Signal Processor (DSP), a group of processing components, or other suitable electronic processing components. The memory 316 (e.g., Random Access Memory (RAM), Read-Only Memory (ROM), Non-volatile RAM (NVRAM), Flash Memory, hard disk storage, etc.) stores data and/or computer code for facilitating at least some of the various processes described herein. The memory 316 includes tangible, non-transient volatile memory, or non-volatile memory. The memory 316 may include a non-transitory processor readable medium having stored programming logic that, when executed by the processor 312, controls the operations of the charging management system 104. In some arrangements, the processor 312 and the memory 316 form various processing circuits described with respect to the charging management system 104 (e.g., a pricing circuit 320, an allocation circuit 324, and a charge management circuit 328).

As shown, the charging management system 104 includes a network interface 332. The network interface 332 is structured for sending and receiving data over the communication network 118 (e.g., to and from the EV agents 112, the pricing authority 116, etc.). Accordingly, the network interface 332 includes any of a cellular transceiver (for cellular standards), local wireless network transceiver (for 802.11X, ZigBee, Bluetooth, Wi-Fi, or the like), wired network interface, a combination thereof (e.g., both a cellular transceiver and a Bluetooth transceiver), and/or the like.

A charging scenario database 336 of the memory 316 may include or store information indicative of algorithms, equations, look-up tables, and so on for allocating charging power between one or more EVs 108 charging at an EV charging plaza 106 in the EV charging network 102 according to non-congestion charging scenarios, congestion charging scenarios without rebates, and congestion charging scenarios with rebates.

A charging site database 340 of the memory 316 may include or store information indicative of charging parameters of the EV charging ports 120, such as service voltage that the EV charging ports 120 can provide when charging EVs 108, a current rating of each EV charging ports 120, and so on.

The pricing circuit 320 is configured to determining monetary information indicative of an energy price. In some arrangements, determining monetary information indicative of the energy price may include receiving pricing information from the pricing authority 116. In some arrangements, the pricing circuit 320 may be configured to poll the pricing authority 116 according to a predefined time interval. In some arrangements, determining monetary information indicative of the energy price may include price setting, such as setting a flat fee for power over a predefined time period. The pricing information may include past settled prices, past clearing prices, forecasted future prices, recent prices, and flat fees. The pricing information may be a market price for power and/or may include a markup added by providers that charge a fee for on premise EV charging. The pricing information may be defined in terms of fiat currency, cryptocurrency, credits, or other media having monetary value. As described in detail below, the clearing prices are energy prices that have been determined by the allocation circuit 324 based on bids from the EV agents 112. Exemplary pricing information includes day-ahead forecast prices broken down by the hour, a charging price used within the last 5 minutes, and a last hour settled price. The last hour settled price may be based on an average of 125-minute prices from the last hour.

The allocation circuit 324 is configured to determine a power limit $P_{LIM}$ for EV charging. Determining the power limit $P_{LIM}$ may include determining the power limit $P_{LIM}$ based on power capacity information received from a power provider or grid manager such as a utility, determining the power limit $P_{LIM}$ based on conditions of the EV charging network 102, or a physical limitation such as a max power rating of a transformer or circuit breaker, and so on. The power limit $P_{LIM}$ is a maximum rate at which the charging management system 104 can charge the EVs 108 coupled to the EV charging ports 120. In some arrangements, the power limit $P_{LIM}$ is the same across all charging intervals. In some arrangements, the allocation circuit 324 is configured to determine the power limit $P_{LIM}$ for each charging interval. The allocation circuit 324 is configured to determine a minimum power $P_{min}$ for EV charging. The minimum power $P_{min}$ is a minimum rate at which the EV charging ports 120 can charge the EVs 108 in the EV charging network 102. As described in greater detail below, in conditions in which an aggregate amount of power requested by the EV agents 112 is greater than the power limit $P_{LIM}$, the $P_{min}$ is the minimum amount of power that is provided to all of the EVs 108 connected to the EV charging network 102.

The allocation circuit 324 is configured to broadcast the pricing information relative to an upcoming charging interval over the communication network 118. In some arrangements, the upcoming charging intervals may be less than an hour, such as 5 minutes, 10 minutes, 15 minutes, 30 minutes, 1 hour, 2 hours, 3, hours, 4 hours, 5 hours, 6 hours, 7 hours, 8 hours, or any other suitable charging interval. For example, in some arrangements, the allocation circuit 324 may broadcast the pricing information 5 minutes before the start of the upcoming charging interval. In some arrangements, the allocation circuit 324 may broadcast the pricing information at minimum four minutes before the start of the upcoming charging interval. In some arrangements, the broadcast pricing information does not communicate to the EV agents 112 a number of EV agents bidding or the EV power limit $P_{LIM}$ for the upcoming interval.

The allocation circuit 324 is configured to receive bids from each of the EV agents 112 corresponding to EVs connected to the EV charging network 102 before a start of the upcoming charging interval. In some arrangements, the allocation circuit 324 may receive the bids 2 minutes before the start of the upcoming charging interval. Each of the bids may include: an interval start time, an interval stop time, and an agent monetary value, and a bid power $P_{bid}$. The agent monetary value is a price that the user of the EV agent 112 is willing to pay for energy, such as a bid price $\lambda_{bid}$. The agent monetary value may be defined in terms of fiat currency, cryptocurrency, credits, or other media having monetary value. The bid power $P_{bid}$ is a desired charging rate of the user of the EV agent 112. The bid power $P_{bid}$ may be expressed in terms of watts with any unit prefix.

The allocation circuit 324 is configured to configure an aggregate charging power demand based on the bid power $P_{bid}$ values from all of the bids received from the EV agents 112. The allocation circuit 324 is configured to compare the aggregate charging power demand to the power limit $P_{LIM}$. In response to determining that the aggregate power is less than the power limit $P_{LIM}$, the allocation circuit 324 is configured to determine that the system 100 is in a non-congestion scenario. In the non-congestion scenario, the allocation circuit 324 generates charging instructions configured to command each of the EV charging ports 120 in the EV charging plaza 106 to charge each of the EVs 108 according to the bid power $P_{bid}$ provided by the EV agent 112. The allocation circuit 324 is configured to determine the charging price based on the settled price and/or forecast price. The allocation circuit 324 is configured to transmit a message to each of the EV agents 112 including the charging interval start time, the charging interval end time, the amount of power that the charging management system 104 will allow during the interval, and the charging price for the interval. The amount of power may be expressed as a power dispatch limit $P_{DL}$ for the charging interval. The power dispatch limit $P_{DL}$ is a maximum charging rate that a particular EV 108 can charge at during the charging session. In some arrangements, EV 108 acts upon the power dispatch limit $P_{DL}$ and regulates its power draw to not exceed the power dispatch limit $P_{DL}$ during the charging interval. In other arrangements, the EV charging port 120 may receive the power dispatch limit $P_{DL}$ and modify a control signal sent to the EV 108 to limit the max power draw of the EV 108. Still in other embodiments, a charge controller adapter 124 may be used to interface the EV 108 to and EV charging port 120 of EV charging plaza 106. In such embodiments, the charge controller adapter 124 may receive the power dispatch limit $P_{DL}$ and modify a control signal sent to the EV 108 to limit the max power draw. Examples of the charge controller adapter 124 are described in detail in U.S. Pat. No. 9,758,046, filed Nov. 21, 2014, the entire disclosure of which is hereby incorporated by reference herein. In some arrangements, the allocation circuit 324 may transmit the message to the EV agents 112 or other controllers at least a minute before the start of the charging interval. Exemplary non-congestion charging scenarios are described below with respect to FIG. 14.

In response to determining that the aggregate power is greater than the power limit $P_{LIM}$, the allocation circuit 324 is configured to determine that the system 100 is in a congestion scenario. The allocation circuit 324 is configured determine a first amount of power (e.g., a first charging rate) that corresponds to an amount of power required to charge all of the connected EVs 108 at the minimum charging rate $P_{min}$. The allocation circuit 324 is configured to determine a remaining amount of power by subtracting the first amount of power from the power limit $P_{LIM}$. The allocation circuit 324 may then be configured to allocate the remaining amount of power to each of the EVs 108 based on the bid price $\lambda_{bid}$ that each EV agent 112 submitted to the charging management system 104. The allocation circuit 324 is configured to determine a charging amount for each EV 108 and generate a power dispatch limit $P_{DL}$ for each EV 108 in which the EV 108 is charged with a charging power equal to the sum of $P_{min}$ and the portion of the remaining amount of power allocated to that particular EV 108. The power dispatch limits $P_{DL}$ are instructions that cause the charge management circuit 328 to limit the energy consumption rate of each of the EVs as determined by the allocation circuit 324. In some arrangements, the allocation circuit 324 may be configured to bill a first price for the minimum amount of power $P_{min}$ provided to each of the EVs 108 and a second price higher than the first price for the portion of the remaining amount of power allocated to that particular EV 108. In some arrangements, the allocation circuit 324 may determine a rebate amount for any EVs 108 that receive less than their bid power $P_{bid}$. In such arrangements, the allocation circuit 324 may be configured to determine the rebate amount based on a difference between a particular EV's bid power $P_{bid}$ and an actual amount of power received by that particular EV 108. The allocation circuit 324 is configured to transmit a message to each of the EV agents 112 including the charging interval start time, the charging interval end time, the amount of power provided during the interval, and the energy price for the interval for the particular EV 108 corresponding to the user. The amount of power may be expressed as a charging rate for the charging interval or a total price of the charging interval. In some arrangements, the allocation circuit 324 may transmit the message to the EV agents 112 at least a minute before the start of the charging interval. Exemplary congestion charging scenarios are described below with respect to FIGS. 15-18.

Since each EV 108 is typically charged over multiple charging intervals, the charging management system 104 is configured to store an amount of energy consumed, a billing price for that amount of energy for each of the charging intervals in which the EV 108 has been charging at the EV charging plaza 106. When a particular EV 108 is finished charging (e.g., the EV 108 has been charged according to an amount of charging time desired by the user, an amount of charge desired by the user, the user has unplugged the EV 108, and so on), the charging management system 104 is configured to determine a total amount of energy consumed during all of the charging intervals the EV 108 has used and a total billing price for charging the vehicle over all of the charging intervals that the EV 108 has used.

The charge management circuit 328 is configured to receive the charging instructions for each of the EVs 108 from the allocation circuit 324. The charge management circuit 328 is configured to control the EV charging port 120, the EV 108, and/or the charge controller adapter 124 to provide power to each of the EVs 108 based on the charging instructions for each particular EV 108.

In some arrangements, the charge management circuit 328 may be configured to ban EV agents 112 associated with EVs 108 that do not come within approximately 20-30% of their bid energy ($P_{bid}*\Delta T$, where $\Delta T$ is a total charging time) for one or more consecutive time charging intervals. This may prevent users or EV agents 112 from bidding extremely high prices $\lambda_{bid}$ to maximize their charging rate beyond the charging rates actually needed to receive the desired amount of power $P_{bid}$ during the charging interval, thereby wasting power that could be supplied to other EVs 108 connected to the EV charging network 102. In some arrangements, the charge management circuit 328 may be configured to implement a price cap $\lambda_{cap}$ to prevent users or EV agents 112 from bidding extremely high bid prices $\lambda_{bid}$ to maximize their charging rate beyond the charging rate actually needed to receive the desired amount of power $P_{bid}$ during the charging interval. In such arrangements, the charge management circuit 328 may be configured to compare bid prices $\lambda_{bid}$ from each EV agent 112 to the price cap $\lambda_{cap}$ and, in response to determining that a particular bid price $\lambda_{bid}$ is greater than the price cap $\lambda_{cap}$, set that particular bid price $\lambda_{bid}$ equal to the price cap $\lambda_{cap}$.

In some arrangements, the charging management system 104 and the EV charging ports 120 may be in the same housing, as described above. In some arrangements, the charging management system 104 and the EV charging ports 120 may be in separate housings. In such arrangements, the EV charging port 120 is coupled to a computing system including a processor, a memory device, and a network interface substantially similar to the processor 312, the memory device 316, and the network interface 332. In such arrangements, the processing circuit of the computing system coupled to the EV charging port 120 includes the charge management circuit 328.

Figure 4:
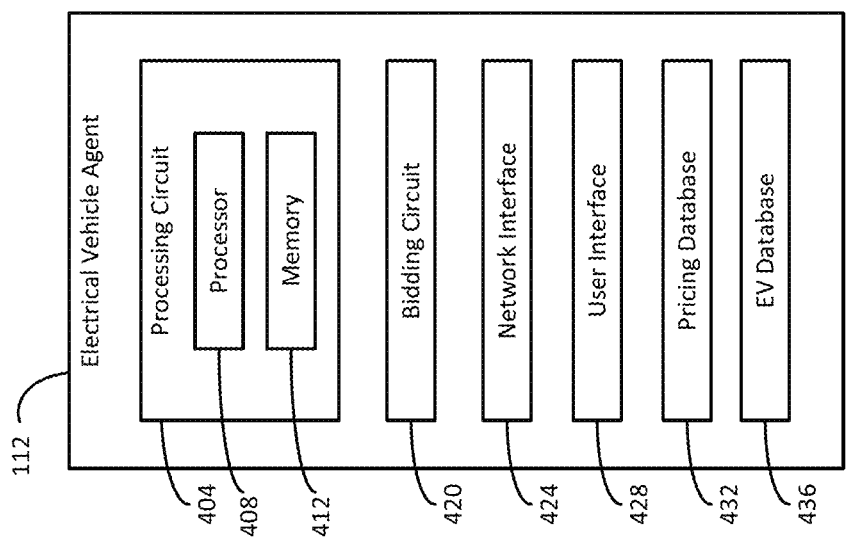
FIG. 4 is a schematic block diagram of an EV agent of the system of FIG. 1, according to some arrangements.

FIG. 4 is a diagram of an example EV agent 112 of the system 100 as set forth in FIG. 1 according to some arrangements. The EV agent 112 determines a charging bid based on information indicative of the state of the onboard vehicle battery, information indicative of an urgency of the user to have the EV 108 charged, and energy pricing information received from the charging management system 104. The EV agent 112 includes a processing circuit 404 including a processor 408 and a memory device 412. The processor 408 is implemented as a general-purpose processor, an Application Specific Integrated Circuit (ASIC), one or more Field Programmable Gate Arrays (FPGAs), a Digital Signal Processor (DSP), a group of processing components, or other suitable electronic processing components. The memory 412 (e.g., Random Access Memory (RAM), Read-Only Memory (ROM), Non-volatile RAM (NVRAM), Flash Memory, hard disk storage, etc.) stores data and/or computer code for facilitating at least some of the various processes described herein. The memory 412 includes tangible, non-transient volatile memory, or non-volatile memory. The memory 412 may include a non-transitory processor readable medium having stored programming logic that, when executed by the processor 408, controls the operations of the EV agent 112. In some arrangements, the processor 408 and the memory 412 form various processing circuits described with respect to the EV agent 112 (e.g., the bidding circuit 420). In other arrangements, the EV agent 112 may be a portion of an onboard computing system of the EV 108.

As shown, the EV agent 112 includes a network interface 424. The network interface 424 is structured for sending and receiving data over the communication network 118 (e.g., to and from the charging management system 104, the EV 108 associated with the EV agent 112, etc.). Accordingly, the network interface 424 includes any of a cellular transceiver (for cellular standards), local wireless network transceiver (for 802.11X, ZigBee, Bluetooth, Wi-Fi, or the like), wired network interface, a combination thereof (e.g., both a cellular transceiver and a Bluetooth transceiver), and/or the like.

The user interface 428 is configured to exchange information with a user. An input device or component of the user interface 428 allows the user to provide information to the EV agent 112, and may include, for example, a mechanical keyboard, a touchscreen, a microphone, and so on. An output device or component of the user interface 428 allows the user to receive information from the EV agent 112, and may include, for example, a digital display, a speaker, illuminating icons, LEDs, and so on. For example, the user may use the user interface 428 to view, generate, and/or edit a charging parameters, view information indicative of a status of a current charging session, view summary information of one or more past charging sessions, and so on.

A pricing database 432 may include information indicative of algorithms, equations, look-up tables, and so on for determining the bid pricing curves 500 (FIG. 5) and 600 (FIG. 6) used to determine the agent monetary value, such as a bid price $\lambda_{bid}$, for an upcoming charging session.

An EV database 436 may include charging parameter information for one or more EVs 108 associated with the EV agent 112. For example, the EV database 436 may include information indicative of a vehicle on-board charger rating, information indicative of an onboard battery storage capacity (e.g., to compensate for aging of the onboard battery, weather conditions that impact the storage capacity of the onboard battery, and so on) for each EV 108 associated with the EV agent 112. In some arrangements, the EV agents 112 may be configured to periodically update the information indicative of the vehicle on-board battery storage capacity of the onboard battery based on information received from the EV 108.

The bidding circuit 420 is configured to receive information indicative of the state of the onboard battery from the EV 108. The information indicative of the state of the onboard battery may include the SOC of the battery, a total charge capacity of the battery, a remaining charge capacity of the battery, and so on.

The bidding circuit 420 is configured to receive desired charging characteristics from the user via the user interface 428. Desired charging characteristics may include an amount of charging time needed, an amount of charge desired, information indicative of a charging urgency of the user, and a desired charge completion time. In some arrangements, the amount of charge desired may be expressed in terms of a mileage of an upcoming trip or an amount of energy needed to complete an upcoming trip. The amount of charging time needed and/or the amount of charge desired may be provided over multiple charging intervals. In such arrangements, the bidding circuit 420 is configured to transmit a bid for each interval until the EV 108 has been charged as desired by the user.

The information indicative of an urgency of a customer is an indication of how strongly the user of the EV 108 wants to have the EV 108 charged to the desired amount of charging by the desired charge completion time. For example, the user may use a slider bar 716 (FIG. 7), a selection menu, and so on to enter an urgency value ranging from "most flexible" to "most urgent."

In some arrangements, a higher urgency value indicates that the user is willing to pay a higher energy price to have the EV 108 charged to the desired charging amount by the desired charge completion time and a lower urgency value indicates that the user is willing to pay a lower energy price in exchange for the EV 108 not, or potentially not being charged to the desired charging amount by the desired charging time. The bidding circuit 420 is configured to determine a driver cost-urgency trade-off constant k based on the information indicative of the urgency of the customer. In some arrangements, the pricing circuit 320 is configured to receive a maximum bid limit $\lambda_{lim}$ input by the user via the user interface 428.

In some arrangements, the bidding circuit 420 may be configured to receive pricing information and a current charging rate $P_C$ (e.g., a current charging power) from the charging management system 104. The pricing information may include past settled prices, past clearing prices, forecasted future prices, and recent prices. In some arrangements, the bidding circuit 420 may be configured to store a history of past bid prices and/or past pricing information received from the charging management system 104. The bidding circuit 420 is configured to determine a predicted energy price $\lambda_{pred}$ based on the pricing information.

In some arrangements, the bidding circuit 420 is configured to receive the minimum charging power $P_{min}$ and the maximum charging power $P_{max}$ for the EV 108. In some arrangements, the bidding circuit 420 is configured to determine the minimum charging power $P_{min}$ according to the equation below:

$$P_{min} = \text{minimum ampacity} * \text{AC RMS charging voltage} \quad (1),$$

where the "AC RMS" is the alternating current root mean squared charging voltage and minimum ampacity is the defined minimum charge rate of vehicle charging system 100 or the minimum charge rate allowed by the applicable EV charging standards, such as SAE J1772™ IEC 61851, and IEC 62196, GB/T, CHAdeMO, Tesla, all of which are incorporated by reference herein in relevant part.

The bidding circuit 420 is configured to compare the current charging rate $P_C$ to a desired charging rate $P_D$. In some arrangements, the minimum ampacity is a minimum J1772 ampacity, 6 amps. The bidding circuit is configured to determine the maximum charging power $P_{max}$ according to the equation below:

$$P_{max} = \text{varmin}(A_{charge} * V_{charge}) \quad (2),$$

where $A_{charge}$ is the charging ampacity of the EV charging plaza 106 and $V_{charge}$ is the charging voltage of the EV charging plaza 106.

The bidding circuit 420 is configured to compare the current charging rate $P_C$ to the minimum charging rate $P_{min}$ and the maximum charging rate $P_{max}$. In response to determining that the current charging rate $P_C$ is between the minimum charging rate $P_{min}$ and the maximum charging rate $P_{max}$, the bidding circuit 420 is configured to determine a bid pricing curve similar to the bid pricing curve 500 illustrated in FIG. 5. In response to determining that the current charging rate $P_C$ is equal to the minimum charging rate $P_{min}$ or the maximum charging rate $P_{max}$, the bidding circuit is configured to determine a pricing curve similar to the bid pricing curve 600 illustrated in FIG. 6.

Figure 5:
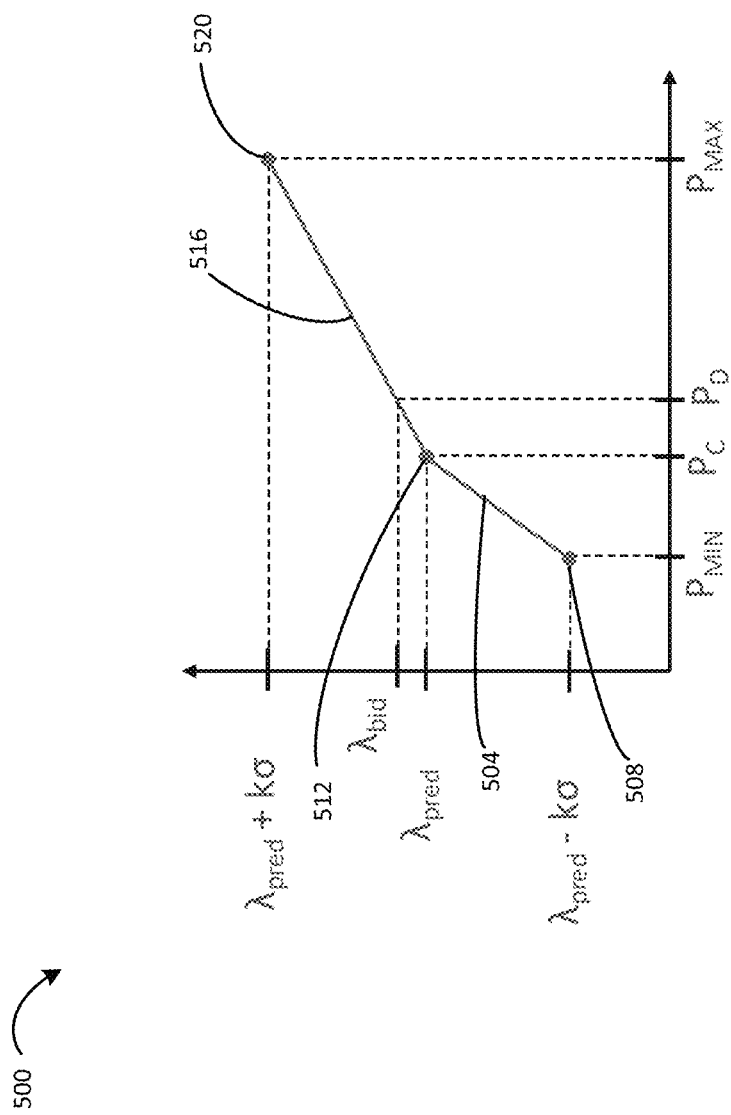
FIG. 5 is a charging power versus bid price curve that may be used by the EV agent of FIG. 4, according to some arrangements.

FIG. 5 illustrates the exemplary bid pricing curve 500, which the bidding circuit 420 is configured to generate in response to determining that the current charging rate $P_C$ is between the minimum charging rate $P_{min}$ and the maximum charging rate $P_{max}$. The bidding circuit 420 is configured to determine a maximum bid price $\lambda_{max}$ and a minimum bid price $\lambda_{min}$ based on the predicted price $\lambda_{pred}$ the cost-urgency tradeoff constant k according to the equations below:

$$\lambda_{max} = \lambda_{pred} + k\sigma \quad (3)$$

$$\lambda_{min} = \lambda_{pred} - k\sigma \quad (4),$$

where σ is a standard deviation of pricing information such as the predicted price $\lambda_{pred}$ over a predefined time period or a standard deviation of historical prices stored in the memory 412 of the EV agent 112.

The bid pricing curve 500 is a price vs. power curve. The bidding circuit 420 is configured to determine a first (e.g., $P_C$-$P_{min}$) curve segment 504 between a point 508 ($P_{min}$, $\lambda_{min}$) and a point 512 ($P_C$, $\lambda_{pred}$). The bidding circuit 420 is configured to determine a second (e.g., $P_C$-$P_{max}$) curve segment 516 between the point 512 ($P_C$, $\lambda_{pred}$) and a point 520 ($P_{max}$, $\lambda_{max}$).

The bidding circuit 420 is configured to compare the desired charging rate $P_D$ to the current charging rate $P_C$. In response to determining that the desired charging rate $P_D$ is greater than the current charging rate $P_C$, the bidding circuit 420 is configured to determine the bid price $\lambda_{bid}$ based on the first curve segment 504. In response to determining that the desired charging rate $P_D$ is less than the current charging rate $P_C$, the bidding circuit 420 is configured to determine the bid price $\lambda_{bid}$ based on the second curve segment 516. In response to determining that the desired charging rate $P_D$ is equal to the current charging rate $P_C$, the bidding circuit 420 is configured to set the bid price $\lambda_{bid}$ equal to the predicted price $\lambda_{pred}$.

Figure 6:
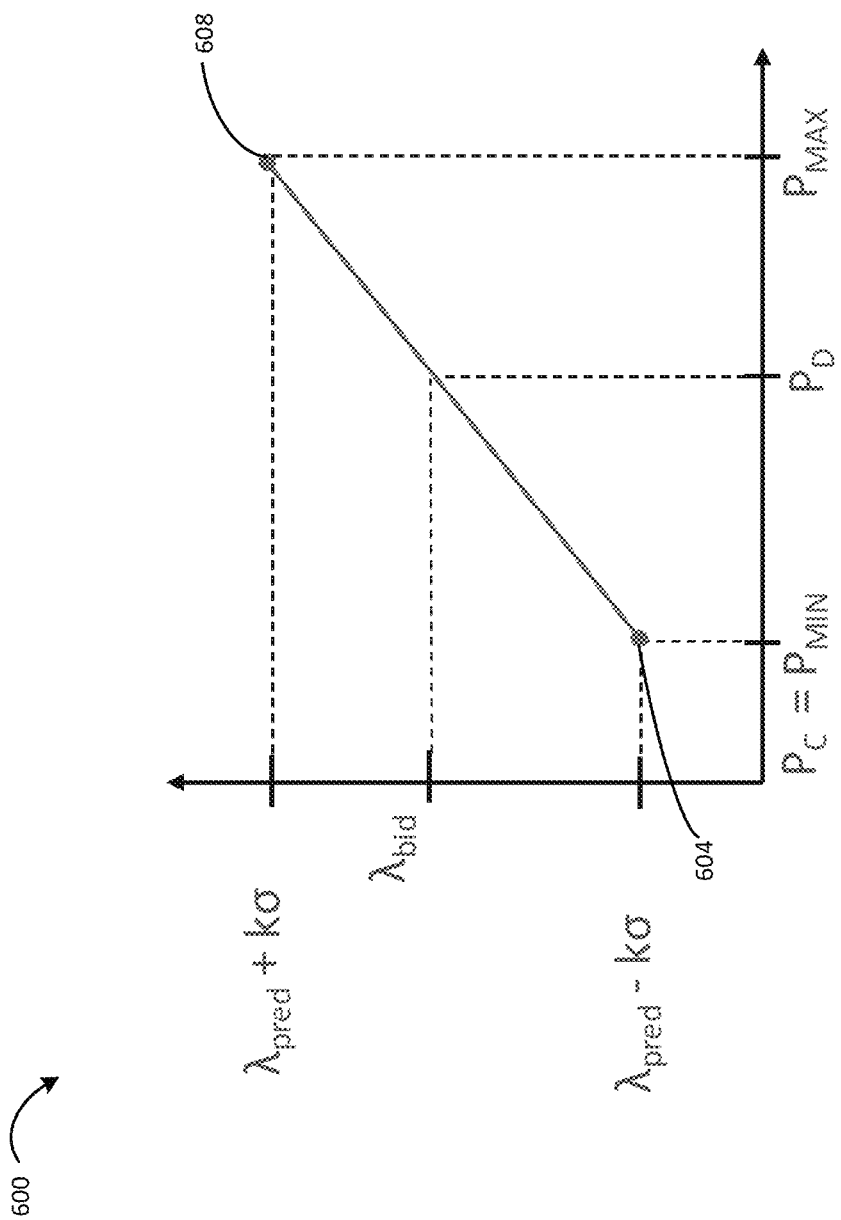
FIG. 6 is another charging power versus bid price curve that may be used by the EV agent of FIG. 4, according to some arrangements.

FIG. 6 illustrates the exemplary bid pricing curve 600, which the bidding circuit 420 is configured to generate in response to determining that the current charging rate $P_C$ is equal to the minimum charging rate $P_{min}$ or the maximum charging rate $P_{max}$. The bidding circuit 420 is configured to determine the maximum bid price $\lambda_{max}$ and the minimum bid price $\lambda_{min}$ according to equations 3 and 4, respectively. The bidding circuit 420 is configured to generate the bid pricing curve 600 between a first point 604 ($P_{min}$, $\lambda_{min}$) and a second point 608 ($P_{max}$, $\lambda_{max}$). The bidding circuit 420 is then configured to determine the bid price $\lambda_{bid}$ based on the bid pricing curve 600.

In arrangements in which the bidding circuit 420 has received the user-input maximum bid price limit $\lambda_{lim}$, the bidding circuit 420 is configured to compare the bid price $\lambda_{bid}$ to the bid maximum bid price limit $\lambda_{lim}$. In response to determining that the bid price $\lambda_{bid}$ is less than or equal to the maximum bid price limit $\lambda_{lim}$, the bidding circuit 420 is configured to maintain the existing value of the bid price $\lambda_{bid}$. In response to determining that the bid price $\lambda_{bid}$ is greater than the maximum bid price limit $\lambda_{lim}$, the bidding circuit 420 is configured to set the bid price $\lambda_{bid}$ equal to the maximum bid price limit $\lambda_{lim}$.

The bidding circuit 420 is configured to generate a bid data packet including the bid power $P_{bid}$ (the desired power $P_D$) and the bid price $\lambda_{bid}$. The bidding circuit 420 is configured to transmit the bid to the charging management system 104 over the network. In some arrangements, the bidding circuit 420 is configured to transmit the bid to the charging management system 104 at least two minutes before a start of the upcoming charging interval. The bidding circuit 420 is configured to receive a message from the charging management system 104 indicating an actual charging power (charging rate, often expressed as the dispatch limit $P_{DL}$) that the particular EV 108 corresponding to the EV agent 112 will be allowed to consume through EV charging plaza 106 and a forecasted charging price for the upcoming charging interval. In some circumstances, the forecasted charging price maybe above the bid price $\lambda_{bid}$. In some arrangements, under such circumstances, the EV agent 112 may be configured to decline charging during the upcoming charging interval. The EV agent 112 may continue bidding for future charging intervals, which may allow the EV agent 112 to facilitate charging the EV 108 at a lower price in the future.

Figure 9:
FIG. 9 is an interface display diagram illustrating an interactive interface displaying a charging session summary screen of the EV agent of FIG. 4, according to some arrangements.
Figure 8:
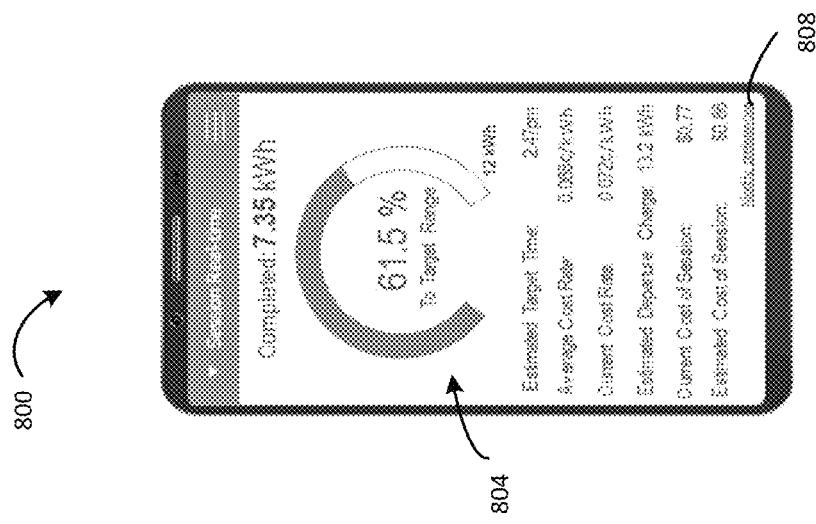
FIG. 8 is an interface display diagram illustrating an interactive interface displaying a charging status screen of the EV agent of FIG. 4, according to some arrangements.
Figure 7:
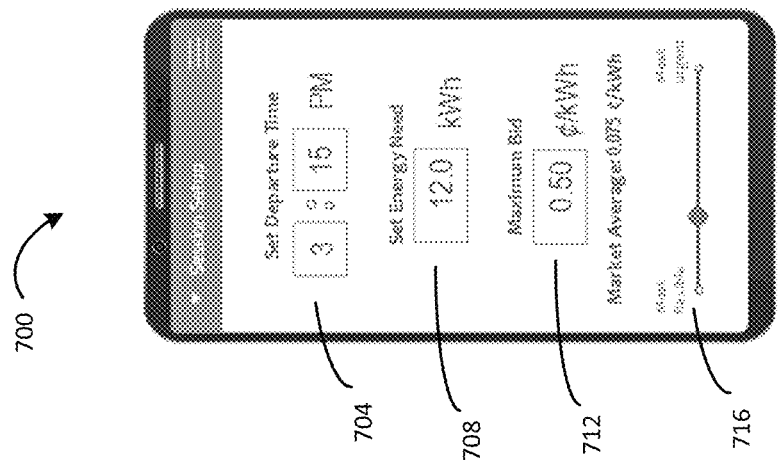
FIG. 7 is an interface display diagram illustrating an interactive interface displaying an exemplary charging parameter configuration screen of the EV agent of FIG. 4, according to some arrangements.

FIGS. 7-9 illustrate exemplary screens (e.g., graphical user interfaces) of the user interface 428 of the EV agent 112 according to exemplary arrangements. The screen may include a display of a mobile phone, a tablet, a laptop, an onboard screen of the EVs 108, or any other suitable display. FIG. 7 illustrates an exemplary charging parameter configuration screen 700 of the user interface 428 of the EV agent 112 for setting up charging parameters of an upcoming charging session. The charging parameter configuration screen 700 includes a user input field 704 configured to receive information indicative of a desired departure time from a user of the EV agent 112. The charging parameter configuration screen 700 includes a user input field 708 configured to receive information indicative of the desired amount of power $P_D$ for the upcoming charging period. The charging parameter configuration screen 700 includes a user input field 712 configured to receive information indicative of the maximum bid price limit $\lambda_{lim}$ from the user. While the user input fields 704-712 are illustrated as text-entry fields, other types of user input fields may be used, such as drop-down menus, buttons, voice input, and so on.

The charging parameter configuration screen 700 includes a user input field 716 configured to elicit information about a charging urgency-cost trade-off of the user. In the illustrated arrangement, the user input field 716 is configured to allow a user to position a marker along a range bounded by a "most flexible" option to a "most urgent" option. Selecting an urgency value at or proximate the "most flexible" indicates that the user has a low urgency to have the EV 108 charged to the desired power amount $P_D$ during the upcoming charging interval and is willing to charge the EV 108 at a lower rate and a lower charging price. Selecting an urgency value at or proximate the "most urgent" indicates that the user has a high urgency to have the EV 108 charged to the desired power amount $P_D$ during the upcoming charging interval and is willing to charge the EV 108 at a lower rate and is willing to pay a higher charging price to have the EV 108 charged to the desired power amount $P_D$ during the upcoming charging interval. While the user input field 716 is illustrated as a slider bar, other types of user input fields may be used, such as a drop-down menu, text entry field, buttons, voice input, and so on.

FIG. 8 illustrates an exemplary charging status screen 800 of the user interface 428 of the EV agent 112 that may be displayed during an ongoing charging interval. The charging status screen 800 may include charging status information 804, such as information indicative of a current amount of charge received, an estimated target completion time, an average charging cost, a current charging cost, an estimated total amount of charge received during the charging session, a current cost of the charging session, an estimated total cost of the charging session, and so on. In some arrangements, the charging status screen 800 may include a user input 808 configured to allow the user to make changes to the charging parameters of the current charging session. In some arrangements, the EV agent 112 may be configured to notify, via the user interface 428, the user in response to determining that session targets will likely not be met. In some arrangements, the EV agent 112 may display the notification via the charging status screen 800. In other arrangements, the EV agent 112 may generate an auditory notification, transmit the notification via text message or e-mail, and so on. The charging status screen 800 may be configured to display information indicative of the charging status during the charging interval in real-time or substantially real-time.

FIG. 9 illustrates an exemplary charging session summary screen 900 of the user interface 428 of the EV agent 112 that may be displayed after completion of a charging session. The charging session summary screen 900 may display information related to a past charging session, such as a total amount of energy received during the charging session, a charging session duration, total charging session cost, a session average charging cost rate, a session rebate amount, a market average charging cost rate, and so on.

Figure 10:
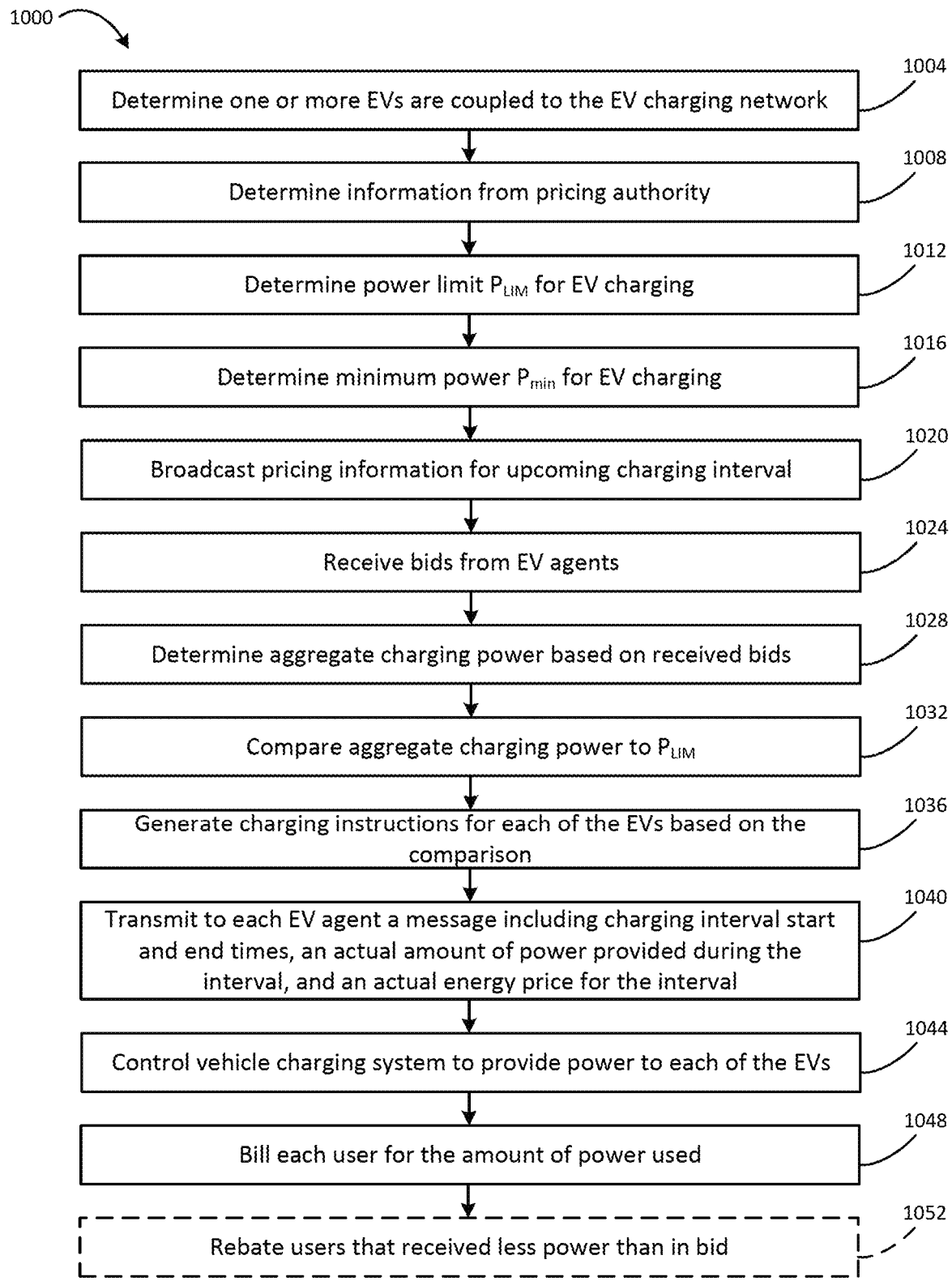
FIG. 10 is a diagram of a method for allocating the amount of charging power to the plurality of EVs via the charging management system of FIG. 3, according to some arrangements.

FIG. 10 is a schematic flow diagram of a method 1000 for allocating the amount of charging power to the plurality of EVs via the charging management system 104, according to various arrangements. While described generally with respect to the charging management system 104, the EVs 108, and the EV agents 112, it should be appreciated that the method 1000 may be used with other power management systems.

The method 1000 is generally initiated in response to determining that one or more EVs 108 are charging at an EV charging plaza 106 in EV charging network 102, at 1004. At 1008, the charging management system 104 determines monetary information related to a price of power. For example, the charging management system 104 may receive pricing information from the pricing authority 116, determine a price based on stored pricing information, and/or set a flat fee for power. In some arrangements, the pricing circuit 320 may poll the pricing authority 116 according to a predefined time interval. The pricing information may include past settled prices, past clearing prices, forecasted future prices, recent prices, and flat fees.

At 1012, the charging management system 104 determines a power limit $P_{LIM}$ for EV charging. The power limit $P_{LIM}$ is the maximum rate at which the EV charging network 102 can charge the EVs 108 controlled by charging management system 104. In some arrangements, the power limit $P_{LIM}$ is the same across all charging intervals. In some arrangements, the allocation circuit 324 determines the power limit $P_{LIM}$ for each charging interval. At 1016, the charging management system 104 determines the minimum power $P_{min}$ for EV charging. The minimum power $P_{min}$ is the minimum rate at which each EV 108 connected to the EV charging network 102 can charge.

At 1020, the charging management system 104 broadcasts the pricing information received from the pricing authority 116 for the upcoming charging interval over the communication network 118. The charging management system 104 is not required to communicate to the EV agents 112 a number of EV agents bidding or the EV power limit $P_{LIM}$ for the upcoming charging interval.

At 1024, the charging management system 104 receives bids from each of the EV agents 112 corresponding to EVs 108 charging at an EV charging plaza 106 of the EV charging network 102 before a start of the upcoming charging interval. Each of the bids received from the EV agents 112 include, but are not limited to: the interval start time, the interval stop time, the agent monetary value (e.g., bid price $\lambda_{bid}$), and the bid power $P_{bid}$.

Figure 11:
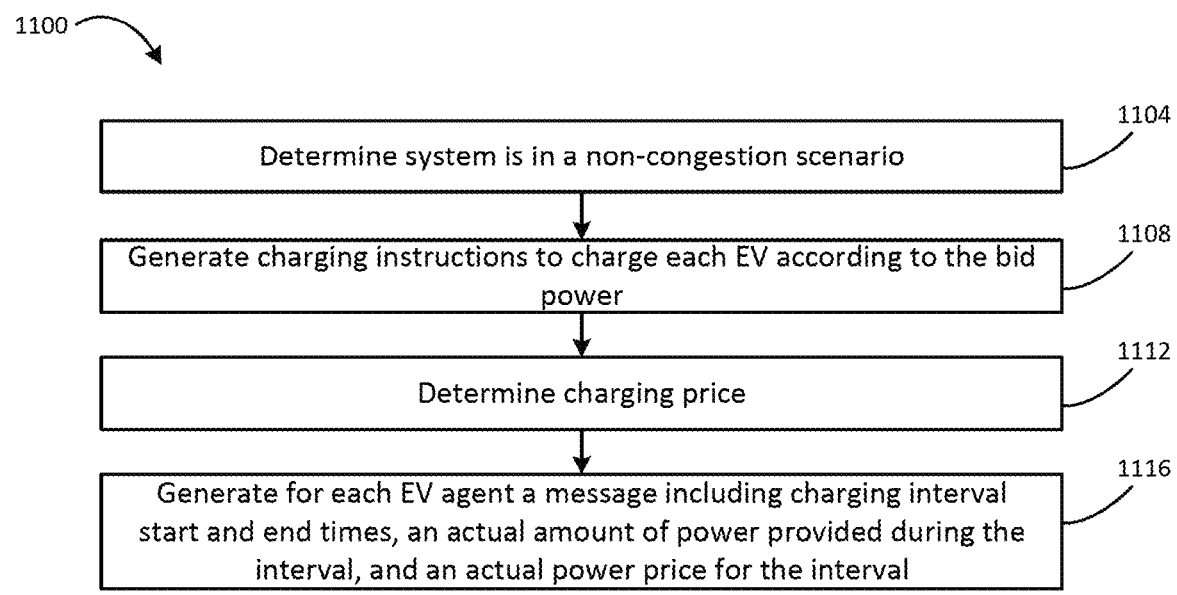
FIG. 11 is a schematic flow diagram of a method for determining charging instructions and a charging price for EVs via the charging management system of FIG. 3 during non-congestion charging scenarios, according to some arrangements.
Figure 12:
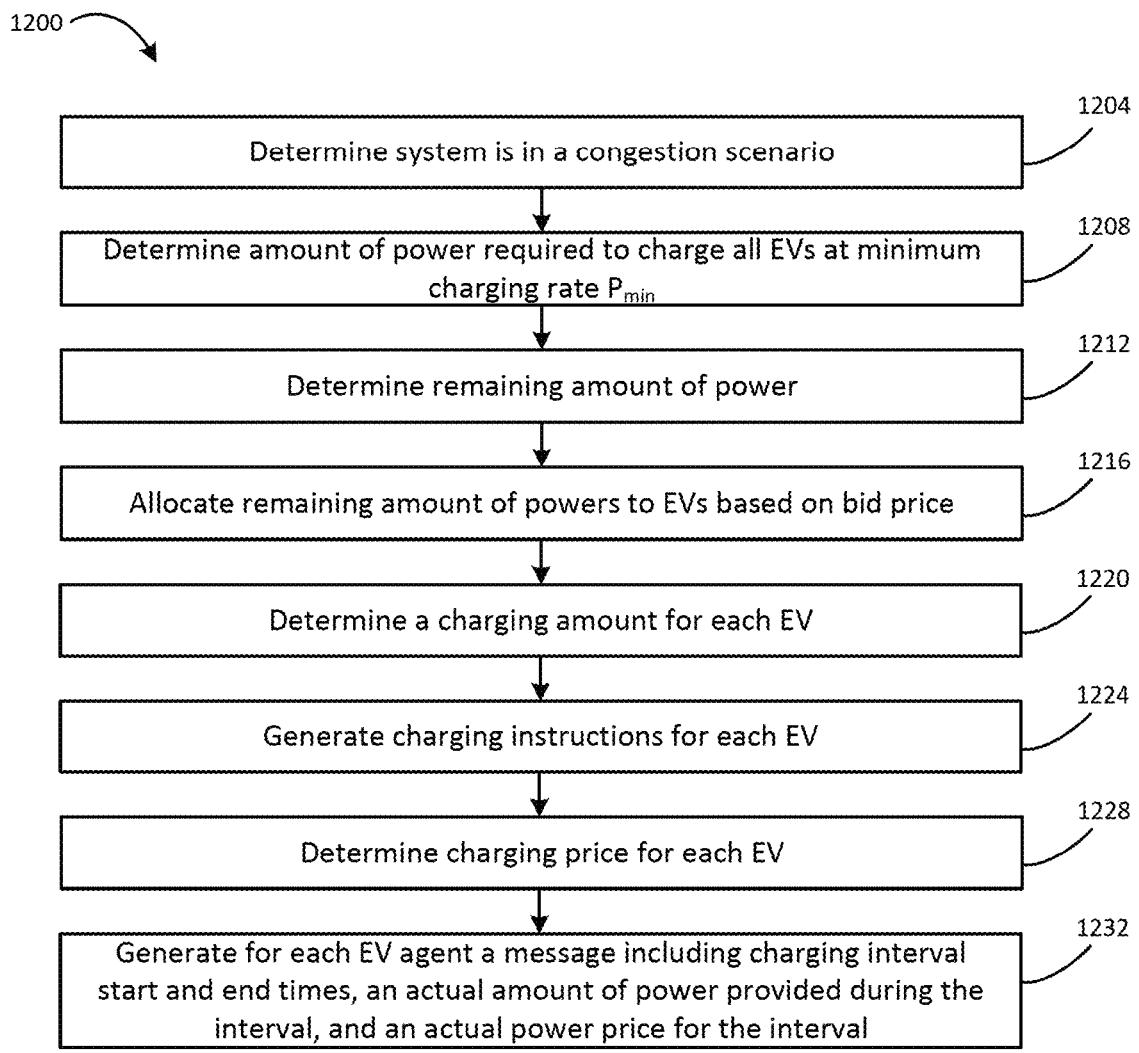
FIG. 12 is a schematic flow diagram of a method for determining charging instructions and a charging price for EVs via the charging management system of FIG. 3 during congestion charging scenarios, according to some arrangements.

At 1028, the charging management system 104 determines the aggregate power charging power demand based on the bid power $P_{bid}$ values from all of the bids received from the EV agents 112. At 1032, the charging management system 104 compares the aggregate charging power demand to the EV power limit $P_{LIM}$. At 1036, the charging management system 104 generates power dispatch limits $P_{DL}$ for each of the EVs and determines a charging price based on the comparison. For example, in response to determining that the aggregate power is less than or equal to the EV power limit $P_{LIM}$, the charging management system 104 generates the EV charging instructions and determines the charging price according to a non-congestion scenario, as shown in FIG. 11. In response to determining that the aggregate power is greater than the EV power limit $P_{LIM}$, the charging management system 104 generates the EV charging instructions and determines the charging price according to a congestion scenario, as shown in FIG. 12.

At 1040, the charging management system 104 transmits to each of the EV agents 112 a message including the charging interval start time, the charging interval end time, an actual amount of power provided during the interval, and an actual energy price for the interval.

At 1044, the charge management circuit 328 receives the power dispatch limit $P_{DL}$ for each of the EVs 108 and controls the EV charging plaza 106 to provide power to each of the EVs 108 based on the power dispatch limit $P_{DL}$ for each particular EV 108.

At 1048, the charging management system 104 bills each user for the amount of power used by the particular EV 108 corresponding to the user. Optionally, at 1052, the charging management system 104 may determine a rebate amount for any EVs 108 that receive less than the bid power $P_{bid}$ requested by that particular EV 108 and refund the user by the rebate amount. For example, the allocation circuit 324 may determine the rebate amount based on a difference between a particular EV's bid power $P_{bid}$ and an actual amount of power received by that particular EV 108.

FIG. 11 is a schematic flow diagram of a method 1100 for determining power dispatch limits, $P_{DL}$, and a charging price for EVs 108 charging at an EV charging plaza 106 in EV charging network 102 during non-congestion charging conditions. The method 1100 occurs during step 1036 of the method 1000.

At 1104, in response to determining that the aggregate power demand is less than or equal to the EV power limit PLM, the allocation circuit 324 determines that the system 100 is in a non-congestion scenario. At 1108, the charging management system 104 generates charging instructions that command the EV charging port 120, the EV 108, and/or the charge controller adapter 124 to charge each of the EVs according to the bid power $P_{bid}$ provided by the EV agent 112. At 1112, the charging management system 104 determines that the EV users will be charged for power according to the settled price. At 1116, the charging management system 104 generates a message for each of the EV agents 112 that includes the charging interval start time, the charging interval end time, an actual amount of power provided during the interval, and an actual energy price for the interval.

FIG. 12 is a schematic flow diagram of a method 1200 for determining charging instructions and a charging price for EVs 108 charging at an EV charging plaza 106 in vehicle charging system 100 during congestion charging conditions. The method 1200 occurs during step 1036 of the method 1000.

At 1204, in response to determining that the aggregate power demand is greater than the EV power limit $P_{LIM}$, the charging management system 104 determines that the system 100 is in a congestion scenario. At 1208, the charging management system 104 determines the first amount of power (e.g., the first charging rate) that corresponds to an amount of power required to charge all of the connected EVs 108 at the minimum charging rate $P_{min}$. At 1212, the charging management system 104 determines a remaining amount of power by subtracting the first amount of power from the EV power limit $P_{LIM}$. At 1216, the charging management system 104 allocates the remaining amount of power to each of the EVs 108 based on the bid price $\lambda_{bid}$ that each EV agent 112 submitted to the charging management system 104. At 1220, the charging management system 104 determines a charging amount for each EV 108. At 1224, the charging management system generates power dispatch limits $P_{DL}$ for each EV 108. Each of the EVs 108 is charged with a charging power equal to the sum of $P_{min}$ and the portion of the remaining amount of power allocated to that particular EV 108. At 1228, the charging management system 104 determines a charging price for each of the EVs 108. In some arrangements, the charging management system 104 may charge a first price for the minimum amount of power $P_{min}$ provided to each of the EVs 108 and a second price higher than the first price for the portion of the remaining amount of power allocated to that particular EV 108. At 1232, the allocation circuit 324 transmits a message to each of the EV agents 112 including the charging interval start time, the charging interval end time, an actual amount of power provided during the interval, and an actual energy price for the interval for the particular EV 108.

Figure 13:
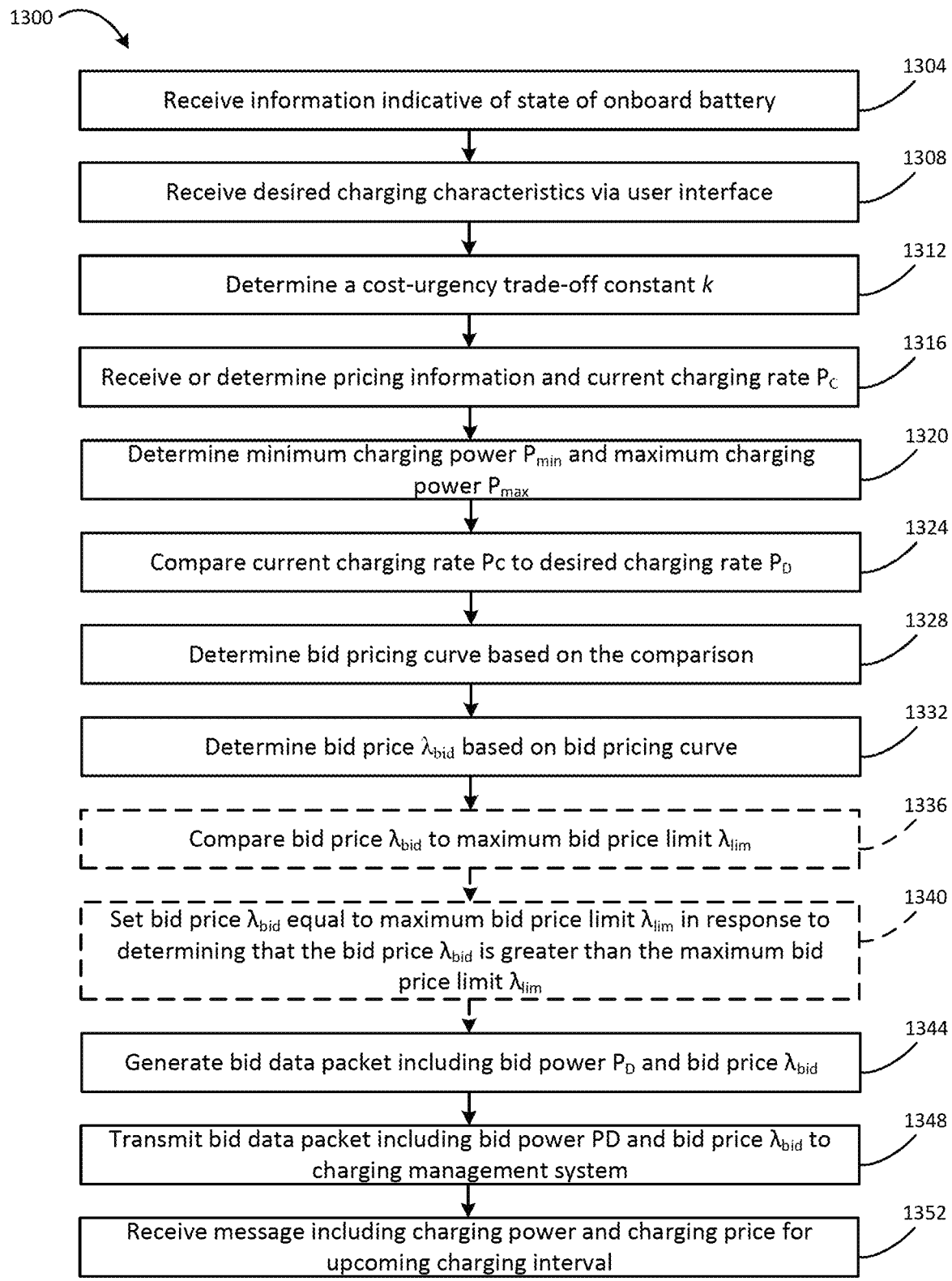
FIG. 13 is a diagram of a method for determining a bid price and bidding for power to charge a particular EV via the EV agent of FIG. 4, according to some arrangements.

FIG. 13 is a schematic flow diagram of a method 1300 for determining a bid price $\lambda_{bid}$ and bid power $P_{bid}$ to charge a particular EV 108 via the EV agent 112, according to various arrangements. The method 1300 is generated when the EV 108 associated with the EV agent 112 is charging at an EV charging plaza 106 in EV charging network 102.

At 1304, the EV agent 112 receives information indicative of the state of the onboard battery from the EV 108. The information may be indicative of the state of the onboard battery includes the SOC of the battery, a total charge capacity of the battery, a remaining charge capacity of the battery, and so on.

At 1308, the EV agent receives desired charging characteristics from the user via the user interface 428. Desired charging characteristics may include an amount of charging time needed, a desired charging amount, information indicative of a charging urgency of the user, and a desired charge completion time. In some arrangements, the desired charging amount may be expressed in terms of a mileage of an upcoming trip or an amount of energy needed to complete an upcoming trip. The information indicative of an urgency of a customer is an indication of how strongly the user of the EV 108 wants to have the EV 108 charged to the desired amount of charging by the desired charge completion time. For example, the user may use a slider bar 716 (FIG. 7), a selection menu, and so on to enter an urgency value ranging from "most flexible" to "most urgent." In some arrangements, the pricing circuit 320 is configured to receive a maximum bid limit $\lambda_{lim}$ input by the user via the user interface. At 1312, the EV agent 112 determines a driver cost-urgency trade-off constant k based on the information indicative of the urgency of the customer.

At 1316, the EV agent 112 determines pricing information and a current charging rate $P_C$ from the charging management system 104. Determining pricing information may include receiving pricing information from the charging management system 104 and/or retrieving pricing information stored to the memory 412. The pricing information may include past settled prices, past clearing prices, forecasted future prices, and recent prices. The bidding circuit 420 is configured to determine a predicted energy price $\lambda_{pred}$ based on the pricing information.

At 1320, the EV agent 112 determines the minimum charging power $P_{min}$ and the maximum charging power $P_{max}$.

At 1324, the EV agent 112 compares the desired charging rate $P_D$ to the current charging rate $P_C$. At 1328, the EV agent 112 determines the bid pricing curve 500, 600 based on the comparison. At 1332, the EV agent 112 determines the bid price $\lambda_{bid}$ based on the bid pricing curve 500, 600. At optional step 1336, in arrangements in which the bidding circuit 420 has received the user-input maximum bid price limit $\lambda_{lim}$, the bidding circuit 420 is configured to compare the bid price $\lambda_{bid}$ to the bid maximum bid price limit $\lambda_{lim}$. At optional step 1340, in response to determining that the bid price $\lambda_{bid}$ is greater than the maximum bid price limit $\lambda_{lim}$, the EV agent 112 sets the bid price $\lambda_{bid}$ equal to the maximum bid price limit $\lambda_{lim}$.

At step 1348, the EV agent generates a bid data packet including the power bid $P_{bid}$ (the desired power $P_D$) and the bid price $\lambda_{bid}$. At step 1352, the bidding circuit 420 is configured to transmit the bid to the charging management system 104 over the communication network 118. At step 1356, the EV agent 112 receives a message from the charging management system 104 indicating the charging power (charging rate) that the particular EV 108 corresponding to the EV agent 112 will receive and a charging price for the upcoming charging interval.

Figure 14:
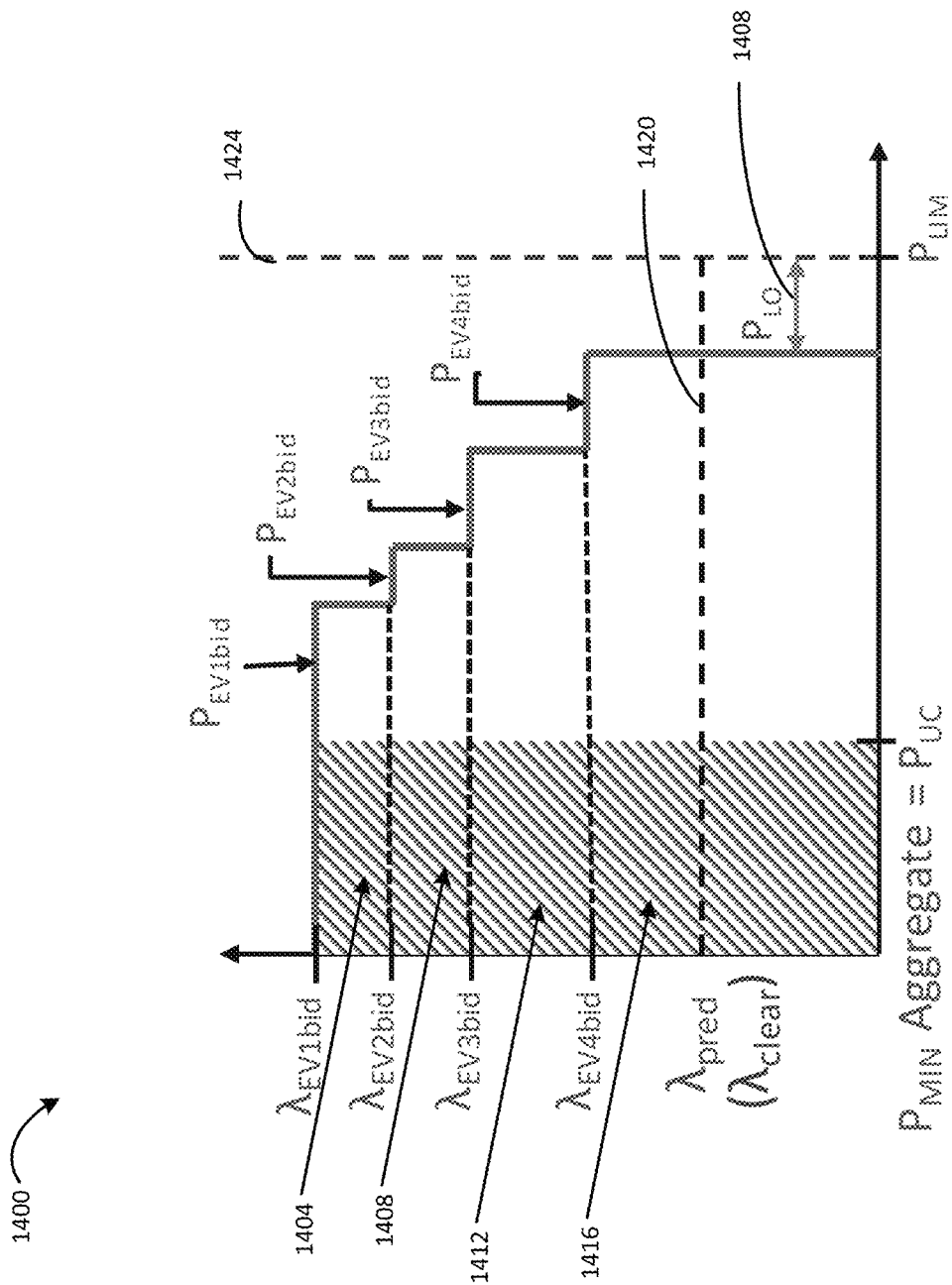
FIG. 14 is a diagram that illustrates a non-congestion charging scenario, according to some arrangements.

FIG. 14 illustrates charging power vs. price plots 1400 for an exemplary non-congestion charging scenario according to some arrangements. The exemplary non-congestion charging scenario includes four EVs substantially similar to the EVs 108: EV1, EV2, EV3, and EV4. The charging management system 104 has received a bid from each of the EV agents 112 associated each of EV1-EV4. FIG. 14 illustrates a bid price $\lambda_{EV1bid}$ and a bid price $P_{EV1bid}$ for EV1 (plot 1404), a bid price $\lambda_{EV2bid}$ and a bid price $P_{EV2bid}$ for EV2 (plot 1408), a bid price $\lambda_{EV3bid}$ and a bid price $P_{EV3bid}$ for EV3 (plot 1412), and a bid price $\lambda_{EV4bid}$ and a bid price $P_{EV4bid}$ (plot 1416) for EV4 that have been received by the allocation circuit 324. The plot 1400 further includes the predicted price $\lambda_{pred}$ (line 1420) that the pricing circuit 320 has received from the pricing authority and the EV power limit $P_{LIM}$ (line 1424). The cross-hatched portions of the plots 1404-1416 illustrate an amount of the respective bid powers $P_{EV1bid}$-$P_{EV4bid}$ that is provided by charging each of the EVs EV1-EV4 with the minimum power $P_{min}$.

After receiving the bids from EV1-EV4, the allocation circuit 324 determines the aggregate charging power $P_{TOT}$ according to the Equation 5.

$$P_{TOT}=P_{EV1bid}+P_{EV2bid}+P_{EV3bid}+P_{EV4bid} \quad (5).$$

The allocation circuit 324 then compares the aggregate charging power $P_{TOT}$ requested to the EV power limit $P_{LIM}$. In the illustrated example, the aggregate charging power $P_{TOT}$ is less than the EV power limit $P_{LIM}$, meaning that EV1-EV4 can all be charged according to their respective bid powers $P_{EV1bid1}$-$P_{EV1bid4}$. The allocation circuit 324 therefore sets the clearing price $\lambda_{clear}$ equal to the predicted price $\lambda_{pred}$. Thus, in the illustrated example, each of the users of the vehicles EV1-EV4 pay less than the respective bid prices $\lambda_{EV1bid}$-$\lambda_{EV4bid}$. In other instances, any users that bid below the predicted price $\lambda_{pred}$ pay more than their bid price $\lambda_{bid}$ (e.g., vehicles that bid below the predicted price $\lambda_{pred}$ still pay the clearing price $\lambda_{clear}$). The allocation circuit 324 determines a remaining amount of power available for dispatch $P_{LO}$ (line 1428) according to the equation:

$$P_{LO}P_{LIM}-P_{TOT} \quad (6).$$

The allocation circuit 324 allocates the remaining power available for dispatch $P_{LO}$ between the vehicles EV1-EV4 based on the bid prices according to the following equations:

$$\lambda_{TOT} = \lambda_{EV1bid} + \lambda_{EV2bid} + \lambda_{EV3bid} + \lambda_{EV4bid} \quad (7)$$

$$P_{EV1DL} = P_{EV1MIN} + P_{EV1bid} + \left(\frac{\lambda_{EV1bid}}{\lambda_{TOT}}\right)*P_{LO}, \quad (8)$$

where $P_{EV1DL}$ is the dispatch limit $P_{DL}$ (max power) sent to EV1, $P_{EV1MIN}$ is the amount of power provided by charging EV1 according to the minimum charging rate $P_{min}$, $P_{EV1bid}$ is the bid power for EV1, $\lambda_{EV1bid}$ is the bid price for EV1, $\lambda_{TOT}$ is the sum of all of the received bid prices $\lambda_{bid}$ received, and $P_{LO}$ is the remaining power available for dispatch. The rightmost term allocates the remaining power available for dispatch $P_{LO}$ based on a percentage of the EV1 bid price $\lambda_{EV1bid}$ relative to the total bid prices, $\lambda_{TOT}$. The allocation circuit 324 uses similar equations to Equation 8 to determine the dispatch limits $P_{EV1DL}$ for EV2-EV4.

Since the bid prices $\lambda_{bid}$ are determined based on the cost-urgency tradeoff constant k (as shown by Equations 3-4), even though in the illustrated example all of the users are charged the same price (the clearing price $\lambda_{clear}$), the allocation circuit 234 allocates the remaining power available for dispatch $P_{LO}$ based on the user's charging urgency.

Figure 15:
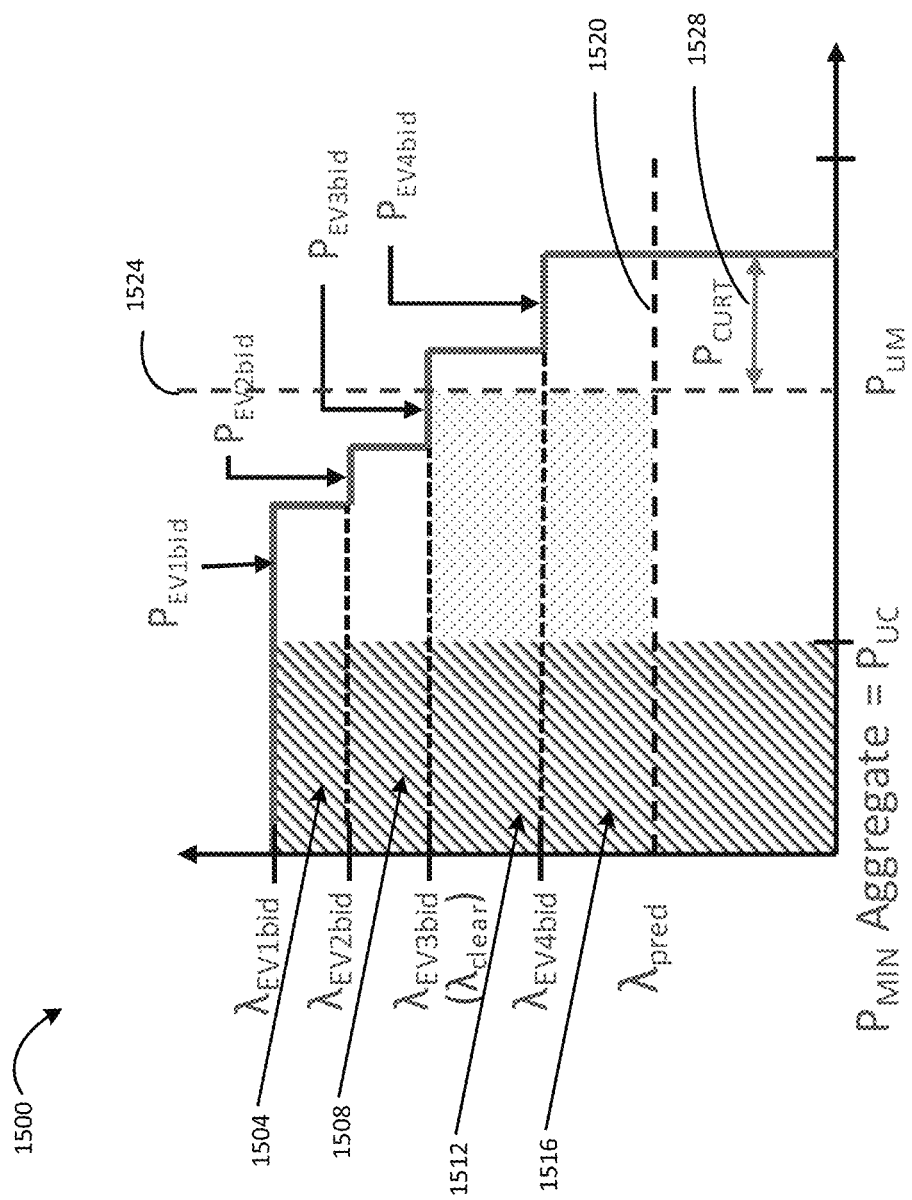
FIG. 15 is a diagram that illustrates a congestion charging scenario with rebates, according to some arrangements.

FIG. 15 illustrates charging power vs. price plots 1500 for an exemplary congestion charging scenario with rebates according to some arrangements. The exemplary congestion charging scenario includes four EVs substantially similar to the EVs 108: EV1, EV2, EV3, and EV4. The charging management system 104 has received a bid from each of the EV agents 112 associated each of EV1-EV4. FIG. 15 illustrates a bid price $\lambda_{EV1bid}$ and a bid price $P_{EV1bid}$ for EV1 (plot 1504), a bid price $\lambda_{EV2bid}$ and a bid price $P_{EV2bid}$ for EV2 (plot 1508), a bid price $\lambda_{EV3bid}$ and a bid price $P_{EV3bid}$ for EV3 (plot 1512), and a bid price $\lambda_{EV4bid}$ and a bid price $P_{EV4bid}$ (plot 1516) for EV4 that have been received by the allocation circuit 324. The plot 1500 further includes the predicted price $\lambda_{pred}$ (line 1520) that the pricing circuit 320 has received from the pricing authority and the EV power limit $P_{LIM}$ (line 1524). The cross-hatched portions of the plots 1504-1516 illustrate an amount of the respective bid powers $P_{EV1bid}$-$P_{EV4bid}$ that is provided by charging each of the EVs EV1-EV4 with the minimum power $P_{min}$. The dotted portions of plots 1512 and 1516 illustrate schematic representations of rebate areas.

After receiving the bids from EV1-EV4, the allocation circuit 324 determines the aggregate charging power $P_{TOT}$ according to the Equation 5. The allocation circuit 324 then compares the aggregate charging power $P_{TOT}$ requested to the EV power limit $P_{LIM}$. In the illustrated example, the aggregate charging power $P_{TOT}$ is greater than the EV power limit $P_{LIM}$, meaning that EV1-EV4 cannot all be charged according to their respective bid powers $P_{EV1bid1}$-$P_{EV1bid4}$. The portion of the aggregate charging potential $P_{TOT}$ that exceeds the EV power limit $P_{LIM}$ is illustrated in FIG. 15 as the curtailment power $P_{CURT}$ (line 1538). The allocation circuit 324 is configured to determine $P_{CURT}$ according to the equation below:

$$P_{CURT} = P_{EV1bid} + P_{EV2bid} + P_{EV3bid} + P_{EV4bid} - P_{LIM} \quad (9)$$

In example illustrated in FIG. 12, the allocation circuit 324 allocates power to charge each of EV1-EV4 according to the minimum power $P_{min}$ and allocates a remaining amount of power amongst EV1-EV4 based on the bid prices $\lambda_{EV1bid}$-$\lambda_{EV4bid}$. The allocation circuit 324 allocates power capacity to the EVs having the highest bid prices $\lambda_{bid}$ before allocating power capacity to the EVs having lower bid prices $\lambda_{bid}$. The allocation circuit 324 determines a crossing price based on this allocation. The clearing price $\lambda_{clear}$ corresponds to the highest bid price $\lambda_{bid}$ having a bid power $P_D$ that cannot be met. In the example illustrated in FIG. 12, the crossing price is $\lambda_{EV3bid}$. The allocation circuit 324 charges the predicted price $\lambda_{pred}$ for the minimum amount of power $P_{min}$ provided, and charges the clearing price $\lambda_{clear}$ for any power provided beyond the minimum amount of power $P_{min}$ provided. The clearing price $\lambda_{clear}$ is higher than the predicted price $\lambda_{pred}$.

In the example illustrated in FIG. 15, the allocation circuit 324 allocates the power $P_{min}$ according to the equations:

$$P_{EV1DL} = P_{EV1bid} \quad (10)$$

$$P_{EV2DL} = P_{EV2bid} \quad (11)$$

$$P_{EV3DL} = P_{EV3min} + (P_{LIM} - P_{EV1bid} - PP_{EV2bid} - P_{EV4min}) \quad (12)$$

$$P_{EV4DL} = P_{EV4min} \quad (13),$$

where $P_{EV1DL}$-$P_{EV4DL}$ are the power dispatch limits sent to each of EV1-EV4, respectively, $P_{EV3min}$ and $P_{EV4min}$ are the power provided to EV1-EV4 at the minimum charging power $P_{min}$ and $P_{EV1bid}$ and $P_{EV2bid}$ are the total amounts of additional power provided to EV1 and EV2, respectively.

As illustrated in FIG. 15 and equations 9 and 10, EV1 and EV2 have the highest bids, so the allocation circuit 324 allocates the available charging power such that EV1 and EV2 are charged to the total amount of power requested in each of their bids. The allocation circuit 324 allocates the remaining amount of charging power to the next highest bidder, EV3, which allows EV3 to receive more power than $P_{min}$, but less than the total amount of power requested in its bid. EV4 is only charged according to the minimum charging power $P_{min}$. Thus, EV3 and EV4 do not receive the full amount of power requested in their bids. The curtailment power $P_{CURT3}$ and $P_{CURT4}$ for EV3 and EV4, respectively, are determined according to the equations below:

$$P_{EV3CURT} = P_{CURT} - (P_{4bid} - P_{4min}) \quad (14)$$

$$P_{EV4CURT} = P_{4bid} - P_{4min} \quad (15)$$

In the illustrated example, the allocation circuit 324 is configured to determine the pricing for each of EV1-EV4 based on the equations below:

$$RA = [TEU - (P_{UC} * \Delta T)] * (\lambda_{clear} - \lambda_{base}) \quad (16)$$

$$TEU = \Delta T * P_{LIM} \quad (17)$$

$$RR = \left(\frac{RA}{P_{CURT}}\right) \quad (18)$$

$$B_{EV1} = [(P_{EV1min} * \lambda_{base}) + ((P_{EV1bid} - P_{EV1min}) * \lambda_{clear})] * \Delta T \quad (19)$$

-continued $$B_{EV2} = [(P_{EV2min} * \lambda_{base}) + ((P_{EV2bid} - P_{EV2min}) * \lambda_{clear})] * \Delta T \quad (20)$$

$$B_{EV3} = [(P_{EV3min} * \lambda_{base}) + ((P_{EV3bid} - P_{EV3min}) * \lambda_{clear})] * \Delta T - \left(\frac{P_{EV3CURT}}{RR}\right) \quad (21)$$

$$B_{EV4} = (P_{EV4min} * \lambda_{base}) * \Delta T - \left(\frac{P_{EV4CURT}}{RR}\right), \quad (22)$$

where RA is the total amount of funds available to pay as rebates, RR is the rebate rate, TEU is the total amount of energy used in the charging interval, $\Delta T$ is a length of the charging interval, $B_{EV1}$-$B_{EV4}$ is the amount that each of EV1-EV4 is billed, and $\lambda_{base}$ is an actual price for power during the charging interval. As shown by equations 19-22, the allocation circuit 324 charges EV1-EV4 the base price $\lambda_{base}$ for the minimum amount of power provided, $P_{EV1min}$-$P_{EV4min}$, respectively. As shown by equations 19-21, the allocation circuit 324 charges EV1-EV3 the clearing price $\lambda_{clear}$ for the amount of power provided beyond the minimum charging rate $P_{EV1min}$-$P_{EV3min}$, respectively. As shown by equations 19-20, EV1 and EV2 do not receive any rebates since EV1 and EV2 have each received the amount of power in their bids. As shown by equations 21 and 22, the allocation circuit 324 determines the rebate amount based on the power curtailment value $P_{CURT}$ for each EV that is not charged according to the amount of power requested in their bids. In the illustrated arrangement, all of the money that was paid at the clearing price $\lambda_{clear}$ (by EV1-EV3) is returned to the EVs that were not charged to the amount of power requested in their bids (EV3 and EV4) as rebates so that the system 100 is revenue-neutral.

Thus, the bid prices $\lambda_{bid}$ are determined based on the cost-urgency tradeoff constant k (as indicated in Equations 3-4), the EVs in which the users indicated a higher charging urgency were charged to the desired power $P_D$ specified in their bids, but these users had to pay a higher price for the power beyond the minimum power limit $P_{min}$.

Figure 16:
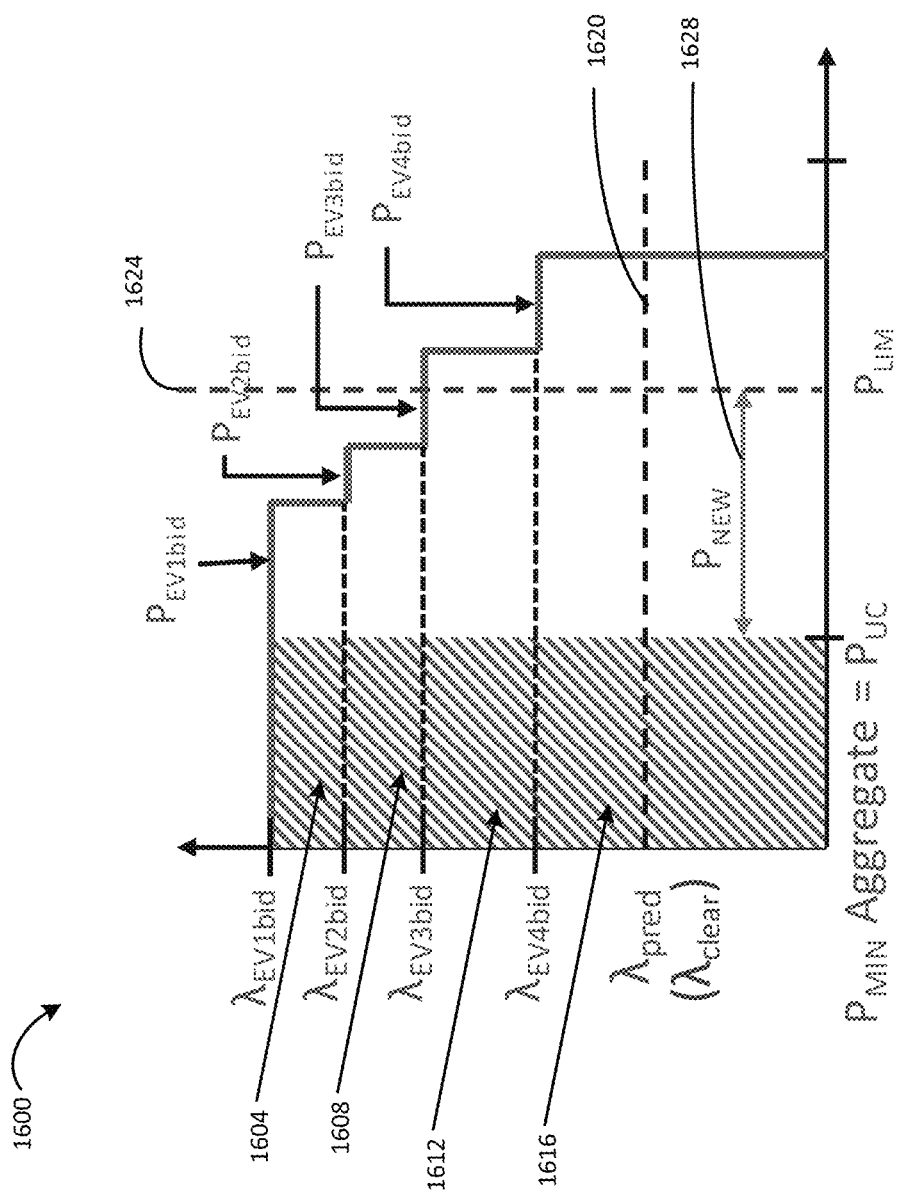
FIG. 16 is a diagram that illustrates a congestion charging scenario without rebates, according to some arrangements.

FIG. 16 illustrates charging power vs. price plots 1600 for an exemplary congestion charging scenario without rebates according to other arrangements. The exemplary congestion charging scenario includes four EVs substantially similar to the EVs 108: EV1, EV2, EV3, and EV4. The charging management system 104 has received a bid from each of the EV agents 112 associated each of EV1-EV4. FIG. 16 illustrates a bid price $\lambda_{EV1bid}$ and a bid price $P_{EV1bid}$ for EV1 (plot 1604), a bid price $\lambda_{EV2bid}$ and a bid price $P_{EV2bid}$ for EV2 (plot 1608), a bid price $\lambda_{EV3bid}$ and a bid price $P_{EV3bid}$ for EV3 (plot 1612), and a bid price $\lambda_{EV4bid}$ and a bid price $P_{EV4bid}$ (plot 1616) for EV4 that have been received by the allocation circuit 324. The plot 1600 further includes the predicted price $\lambda_{pred}$ (line 1620) that the pricing circuit 320 has received from the pricing authority and the EV power limit $P_{LIM}$ (line 1624). The cross-hatched portions of the plots 1604-1616 illustrate an amount of the respective bid powers $P_{EV1bid}$-$P_{EV4bid}$ that is provided by charging each of the EVs EV1-EV4 with the minimum power $P_{min}$.

After receiving the bids from EV1-EV4, the allocation circuit 324 determines the aggregate charging power $P_{TOT}$ according to the Equation 5. The allocation circuit 324 then compares the aggregate charging power $P_{TOT}$ requested to the EV power limit $P_{LIM}$. In the illustrated example, the aggregate charging power $P_{TOT}$ is greater than the EV power limit $P_{LIM}$, meaning that EV1-EV4 cannot all be charged according to their respective bid powers $P_{EV1bid}$-$P_{EV4bid}$. The allocation circuit 324 sets the clearing price $\lambda_{clear}$ equal to the predicted price $\lambda_{pred}$. Thus, in the illustrated example, each of the users of the vehicles EV1-EV4 pay less than the respective bid prices $\lambda_{EV1bid}$-$\lambda_{EV4bid}$. In other instances, any users that bid below the predicted price $\lambda_{pred}$ are not charged. The allocation circuit 324 determines an aggregate amount of power $P_{UC}$ required to charge each of EV1-EV4 to the minimum power $P_{min}$. The allocation circuit 324 calculates a remaining amount of power available for dispatch $P_{new}$ (line 1328) to allocate between EV1-EV4 according to the formula $$P_{NEW} = P_{TOT} - P_{UC} \qquad (23).$$

The allocation circuit 324 allocates the remaining power available for dispatch $P_{NEW}$ between the vehicles EV1-EV4 based on the bid prices according to equation 7 equation 24 below $$P_{EV1DL} = P_{EV1MIN} + P_{EV1bid} + \left(\frac{\lambda_{EV1bid}}{\lambda_{TOT}}\right) * P_{NEW}, \qquad (24)$$

where $P_{EV1DL}$ is the dispatch limit $P_{DL}$ (max power) sent to EV1, $P_{EV1MIN}$ is the amount of power provided by charging EV1 according to the minimum charging rate $P_{min}$, $P_{EV1bid}$ is the bid power for EV1, $\lambda_{EV1bid}$ is the bid price for EV1, $\lambda_{TOT}$ is the sum of all of the received bid prices $\lambda_{bid}$ received, and $P_{LO}$ is the remaining power available for dispatch. The rightmost term allocates the remaining power available for dispatch $P_{new}$ based on a percentage of the EV1 bid price $\lambda_{EV1bid}$ relative to the total bid prices, $\lambda_{TOT}$. The allocation circuit 324 uses similar equations to Equation 24 to determine the amount of power dispatched to EV2-EV4.

Since the bid prices $\lambda_{bid}$ are determined based on the cost-urgency tradeoff constant k (as indicated in Equations 3-4), even though in the illustrated example all of the users are charged the same price (the clearing price $\lambda_{clear}$), the allocation circuit 234 allocates the remaining power available for dispatch $P_{LO}$ based on the user's charging urgency. Since the example illustrated in FIG. 16 charges the same price to EV1-EV4, there are no rebates.

Figure 17:
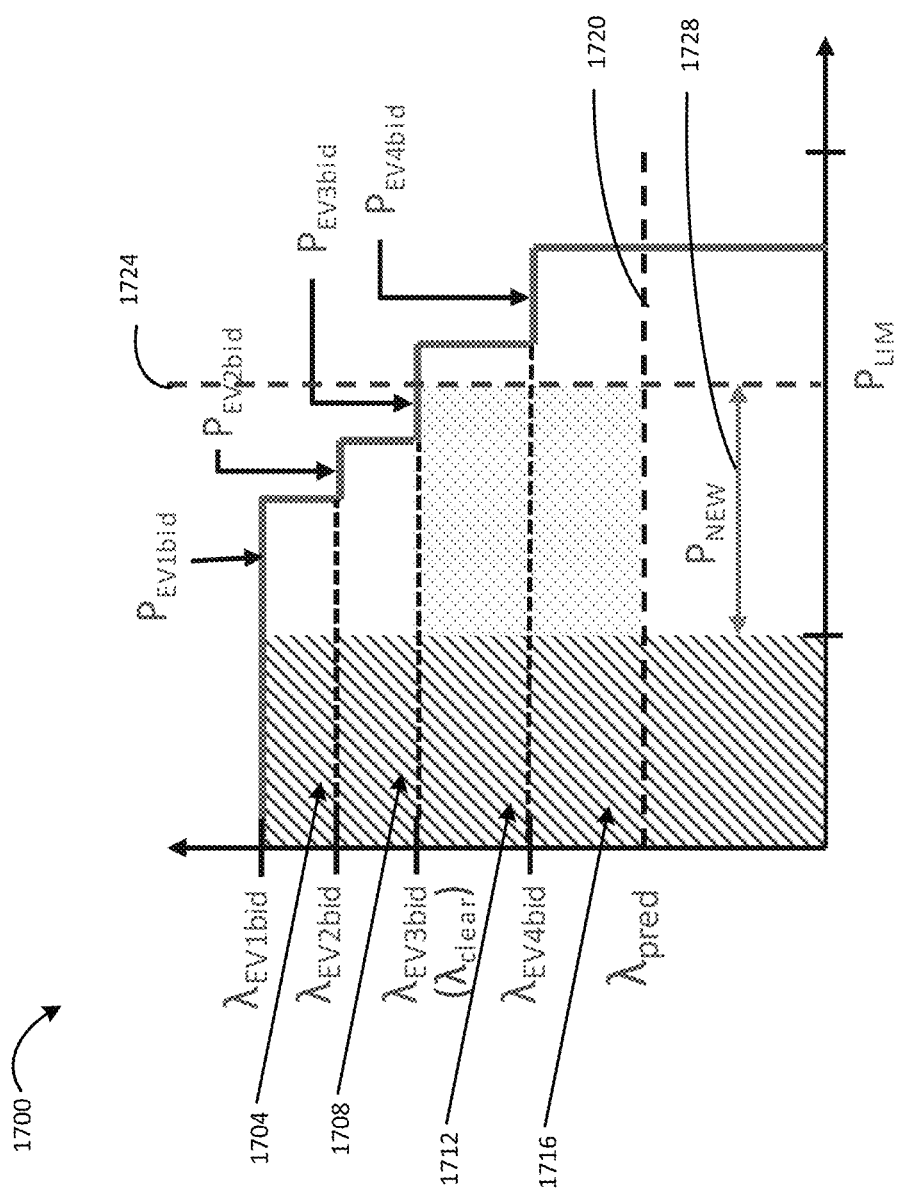
FIG. 17 is a diagram that illustrates a congestion charging scenario with rebates, according to other arrangements.

FIG. 17 illustrates charging power vs. price plots 1700 for an exemplary congestion charging scenario with rebates according to other arrangements. The example illustrated in plot 1700 is substantially similar to plot 1600, and is only discussed in detail as it differs from the plot 1600. Like numbers are used for like parts between FIGS. 16 and 17. The dotted portions of plots 1712 and 1716 illustrate schematic representations of rebate areas.

The allocation circuit 324 allocates the power $P_{LIM}$ between EV1-EV4 as described above with respect to FIG. 16. Since the total amount of power $P_D$ requested from EV1-EV4 is above the EV power limit $P_{LIM}$, and one or more of the vehicles EV1-EV4 may not be charged according to the amount of power $P_D$ in that particular vehicle's bid. The allocation circuit 324 determines a crossing price, which is a highest bid price $\lambda_{bid}$ at which an EV would not be charged to the full power $P_{bid}$ if the EVs had been charged in order of bid price $\lambda_{bid}$ such that available charging power was allocated to the EV(s) with the highest bid price $\lambda_{bid}$ before allocating power capacity to the EVs having lower bid prices $\lambda_{bid}$. The allocation circuit 324 is configured to set the clearing price $\lambda_{clear}$ equal to the crossing price. In the illustrated arrangement, the clearing price $\lambda_{clear}$ is higher than the predicted price $\lambda_{pred}$.

The allocation circuit 324 is configured to determine the curtailment amounts $P_{CURT1}$-$P_{CURT4}$ and billing amounts $B_{EV1}$-$B_{EV4}$ for each of EV1-EV4, respectively, according to the following equations:

$$RA = [TEU - (P_{UC} - \Delta T)] * (\lambda_{clear} - \lambda_{pred}) \qquad (25)$$

$$P_{EV1CURT} = P_{EV1bid} - \left[\left(\frac{TEU_{EV1}}{\Delta T}\right)\right] \qquad (26)$$

$$P_{A\text{-}CURT} = P_{EV1CURT} + P_{EV2CURT} + P_{EV3CURT} + P_{EV4CURT} \qquad (27)$$

where RA is the rebate amount, RR is the rebate rate, TEU is the total energy usage, $TEU_{EV1}$-$TEU_{EV4}$ is the total energy usage for each of EV1-EV4, respectively, $\Delta T$ is the total energy usage during the predefined time interval, $P_{CURT}$ is an amount of power curtailment of the system determined based on the $P_{LIM}$, $P_{A\text{-}CURT}$ is the actual power curtailment for the time interval, and $\lambda_{base}$ is an actual price for power during the charging interval. Equations similar to equation 26 are used to determine $P_{EV2CURT}$-$P_{EV4CURT}$. Equations similar to equation 29 are used to determine the billing amounts $B_{EV2}$-$B_{EV4}$.

Since the bid prices $\lambda_{bid}$ are determined based on the cost-urgency tradeoff constant k (as indicated in Equations 3-4), even though in the illustrated example all of the users are charged the same price (the clearing price $\lambda_{clear}$), the allocation circuit 234 allocates the remaining power available for dispatch $P_{NEW}$ based on the user's charging urgency.

Figure 18:
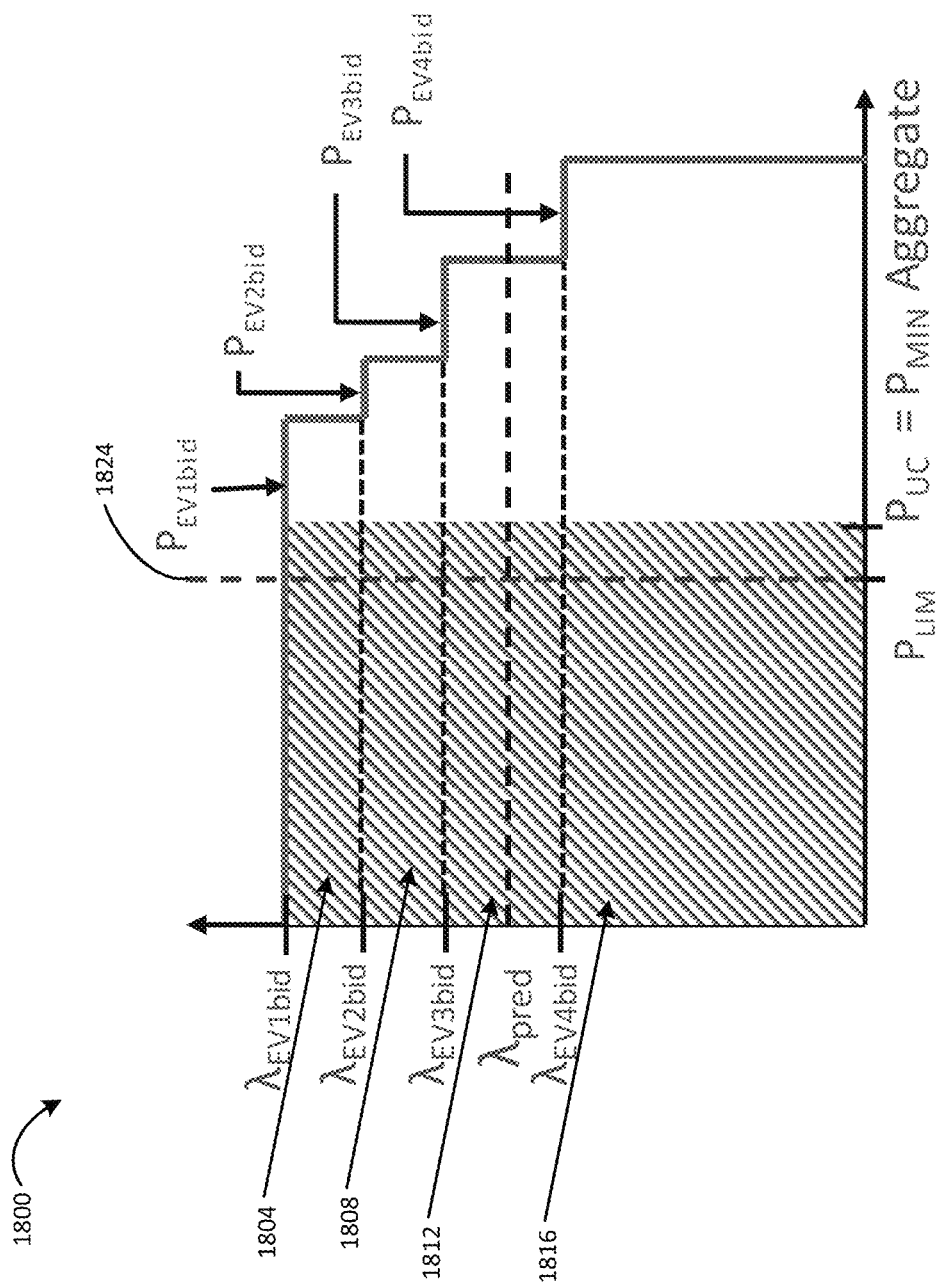
FIG. 18 is a diagram that illustrates a congestion charging scenario, according to other arrangements.

FIG. 18 illustrates charging power vs. price plots 1800 for an exemplary congestion charging scenario according to other arrangements. The exemplary congestion charging scenario includes four EVs substantially similar to the EVs 108: EV1, EV2, EV3, and EV4. The charging management system 104 has received a bid from each of the EV agents 112 associated each of EV1-EV4. FIG. 18 illustrates a bid price $\lambda_{EV1bid}$ and a bid price $P_{EV1bid}$ for EV1 (plot 1804), a bid price $\lambda_{EV2bid}$ and a bid price $P_{EV2bid}$ for EV2 (plot 1808), a bid price $\lambda_{EV3bid}$ and a bid price $P_{EV3bid}$ for EV3 (plot 1812), and a bid price $\lambda_{EV4bid}$ and a bid price $P_{EV4bid}$ (plot 1816) for EV4 that have been received by the allocation circuit 324. The plot 1600 further includes the predicted price $\lambda_{pred}$ (line 1820) that the pricing circuit 320 has received from the pricing authority and the EV power limit $P_{LIM}$ (line 1024). The cross-hatched portions of the plots 1804-1816 illustrate an amount of the respective bid powers $P_{EV1bid}$-$P_{EV4bid}$ that is provided by charging each of the EVs EV1-EV4 with the minimum power $P_{min}$.

After receiving the bids from EV1-EV4, the allocation circuit 324 determines the aggregate charging power $P_{TOT}$ according to the Equation 5. The allocation circuit 324 then compares the aggregate charging power $P_{TOT}$ requested to the EV power limit $P_{LIM}$. In the illustrated example, the aggregate charging power $P_{TOT}$ is greater than the EV power limit $P_{LIM}$, meaning that EV1-EV4 cannot all be charged according to their respective bid powers $P_{EV1bid}$-$P_{EV4bid}$. The allocation circuit 324 determines an aggregate amount of power $P_{UC}$ required to charge each of EV1-EV4 to the minimum power $P_{min}$. The allocation circuit 324 then compares the aggregate amount of power $P_{UC}$ to the EV power limit $P_{LIM}$. The allocation circuit 324 determines that the aggregate amount of power $P_{UC}$ is above the EV power limit $P_{LIM}$, meaning that the EV charging network 102 cannot charge all of EV1-EV4 to the minimum power $P_{min}$. In response to determining that $P_{UC}$ is above the EV power limit $P_{LIM}$, the allocation circuit 324 is configured to deny a lowest bid, recalculate the aggregate amount of power $P_{UC}$ for the remaining EVs, and compare the aggregate amount of power $P_{UC}$ to the EV power limit $P_{LIM}$. The allocation circuit 324 is configured to repeat this process until the aggregate amount of power $P_{UC}$ is less than or equal to the EV power limit $P_{LIM}$. The allocation circuit 324 is then configured to allocate any remaining power to the EVs in any of the congestion charging scenarios described above.

In some arrangements, the charging management system 104 and the EV agents 112 may engage in feedback in response to the charging management system 104 determining that additional power may be available to distribute. For example, in some of the arrangements described above, bids having bid prices $\lambda_{bid}$ less than the predicted price $\lambda_{pred}$ may be denied. This may leave additional charging power that can be allocated amongst the EV agents 112 whose bids are being fulfilled. In another example, additional charging capacity may become available if a user disconnects an EV 108 from the EV charging port 120 during a charging interval. In yet another example, an EV agent 112 may have requested a bid power $P_{bid}$ that was higher than an amount of charging capacity in the on board battery of the EV 108. In such instances, the charging management system 104 may be configured to notify the EV agents 112 that additional charging power is available and allow the EV agents 112 to bid for this additional charging power. The charging management system 104 may then allocate this additional charging power as described above.

In some arrangements, the charging management system 104 and the EV agents 112 may engage in feedback though multiple rounds of bidding. For example, in response to receiving bids from two or more EV agents 112, the charging management system 104 may allocate the available charging power between the two or more EVs 108, and transmit a message to each of the EV agents 112 a message from the charging management system 104 indicating an actual charging power (charging rate, often expressed as the dispatch limit $P_{DL}$) that the particular EV 108 corresponding to the EV agent 112 will be allowed to consume through the EV charging plaza 106 and a forecasted charging price for the upcoming charging interval. The EV agents 112 may then submit additional bids if desired, and the charging management system 104 may re-allocate the available charging power based on the additional bids. The charging management system 104 may send a final message to each of the EV agents 112 after a predefined number of bidding rounds or a predefined time period before a start of the upcoming charging interval that includes a final actual charging power that the particular EV 108 corresponding to the EV agent 112 will be allowed to consume through EV charging plaza 106 and a final forecasted charging price for the upcoming charging interval.

In some arrangements, the charging management system 104 and the EV agents 112 may engage in feedback in response to the charging management system 104 identifying congested charging conditions. In such arrangements, the charging management system 104 may notify the EV agents 112 that bid curtailment and rebates are available and allow the EV agents 112 to revise their bids in order to increase the potential for a refund.

In some arrangements, the vehicle charging system 100 may issue charging credits instead of price per kilowatt hour (kWh) as a bidding commodity. In such arrangements, the users of the vehicle charging system 100 may receive a predefined number of credits over a predefined time period (e.g., weekly, monthly, quarterly, etc.). Charging EVs 108 at EV charging plazas 106 of the EV charging network 102 at the minimum charging rate $P_{min}$ may charge zero credits, and users may bid credits for additional charging rates above the minimum charging rate $P_{min}$. In arrangements in which some users pay credits (or portions of credits) for additional charging rates above the minimum charging rate $P_{min}$ may rebate credits (or portions of credits) to users whose EVs 108 were not charged according to the desired charging power $P_D$ during that time interval, in a manner similar to what is described above with respect to FIGS. 15 and 17.

It should be noted that the term "example" as used herein to describe various arrangements or arrangements is intended to indicate that such arrangements or arrangements are possible examples, representations, and/or illustrations of possible arrangements or arrangements (and such term is not intended to connote that such arrangements or arrangements are necessarily crucial, extraordinary, or superlative examples).

The arrangements described herein have been described with reference to drawings. The drawings illustrate certain details of specific arrangements that implement the systems, methods and programs described herein. However, describing the arrangements with drawings should not be construed as imposing on the disclosure any limitations that may be present in the drawings.

It should be understood that no claim element herein is to be construed under the provisions of 35 U.S.C. § 112(f), unless the element is expressly recited using the phrase "means for."

As used herein, the term "circuit" may include hardware configured to execute the functions described herein. In some arrangements, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some arrangements, a circuit may take the form of one or more analog circuits, electronic circuits (e.g., integrated circuits (IC), discrete circuits, system on a chip (SOCs) circuits, etc.), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on).

The "circuit" may also include one or more processors communicatively coupled to one or more memory or memory devices. In this regard, the one or more processors may execute instructions stored in the memory or may execute instructions otherwise accessible to the one or more processors. In some arrangements, the one or more processors may be embodied in various ways. The one or more processors may be constructed in a manner sufficient to perform at least the operations described herein. In some arrangements, the one or more processors may be shared by multiple circuits (e.g., circuit A and circuit B may comprise or otherwise share the same processor which, in some example arrangements, may execute instructions stored, or otherwise accessed, via different areas of memory). Alternatively or additionally, the one or more processors may be configured to perform or otherwise execute certain operations independent of one or more co-processors. In other example arrangements, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components configured to execute instructions provided by memory. The one or more processors may take the form of a single core processor, multi-core processor (e.g., a dual core processor, triple core processor, quad core processor, etc.), microprocessor, etc. In some arrangements, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud based server). To that end, a "circuit" as described herein may include components that are distributed across one or more locations.

An exemplary system for implementing the overall system or portions of the arrangements might include a general purpose computing computers in the form of computers, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), etc. In some arrangements, the non-volatile media may take the form of ROM, flash memory (e.g., flash memory such as NAND, 3D NAND, NOR, 3D NOR, etc.), EEPROM, MRAM, magnetic storage, hard discs, optical discs, etc. In other arrangements, the volatile storage media may take the form of RAM, TRAM, ZRAM, etc. Combinations of the above are also included within the scope of machine-readable media. In this regard, machine-executable instructions comprise, for example, instructions and data which cause a general purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components, etc.), in accordance with the example arrangements described herein.

It should also be noted that the term "input devices," as described herein, may include any type of input device including, but not limited to, a keyboard, a keypad, a mouse, joystick, touch sensitive screen or other input devices performing a similar function. Comparatively, the term "output device," as described herein, may include any type of output device including, but not limited to, a computer monitor, printer, facsimile machine, or other output devices performing a similar function.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied.

The order or sequence of any element or apparatus may be varied or substituted according to alternative arrangements. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure could be accomplished with standard programming techniques with rule based logic and other logic to accomplish the various database searching steps, correlation steps, comparison steps and While this specification contains many specific implementation details, these should not be construed as limitations on the scope of any arrangement or of what may be claimed, but rather as descriptions of features specific to particular implementations of particular arrangements. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

What is claimed is:

1. A charging management system, comprising:
   a network interface configured to facilitate data communication via a network;
   a memory; and
   a processing circuit comprising a processor, the processing circuit configured to:
   determine one or more electric vehicles (EV) are located at one or more charging sites of an EV charging network;
   provide power, by a charge controller adapter coupled to each charge port associated with each EV of the one or more EVs, from an electrical power supply grid in communication with the one or more charging sites of the EV charging network;
   determine monetary information related to an energy price and including information indicative of a predicted price $\lambda_{pred}$;
   determine an electric vehicle (EV) power limit $P_{LIM}$ for a total amount of the one or more EVs in the EV charging network;
   receive information indicative of the state of an onboard battery for each EV in the EV charging network;
   transmit the monetary information to two or more agents, each of the two or more agents associated with each EV in the EV charging network;
   receive from each of the two or more agents, a bid including: an agent monetary value, a desired charging rate $P_D$, and a charging interval;
   determine based on each of the bids, an aggregate power demand for the charging interval;
   compare the aggregate power demand to the EV power limit $P_{LIM}$;
   determine a power dispatch limit $P_{DL}$ for each EV in the EV charging network;

transmit to each of the two or more agents, a message including: charging interval start and end times, the amount of power to be provided during the charging interval, and the price for the charging interval; and operate the charge controller adapter coupled to each charge port, to provide power to each EV associated with each charge port and with the two or more agents; at no greater than $P_{DL}$, based on each of the bids and the comparison of the aggregate power demand to the EV power limit $P_{LIM}$;

wherein the charge controller adapter comprises a first coupler coupled to one or more of Electric Vehicle Supply Equipment (EVSE), a second coupler coupled to each EV in the EV charging network, and an electronic circuitry electrically coupled to the first coupler and the second coupler, the electronic circuitry configured to provide power from the one or more of the EVSE, via the first coupler, to each EV in the EV charging network, via the second coupler.

2. The charging management system of claim 1, wherein in response to the comparison indicating that the aggregate power demand is less than the EV power limit $P_{LIM}$, the processing circuit is configured to:

provide power, by one or more of the EVSE or the charge controller adapter, to each EV of the one or more EVs according to the desired charging rate $P_D$ in the bid corresponding to each EV;

determine an excess amount of power to distribute; and allocate the excess amount of power to each EV based on the agent monetary value in the bid corresponding to each EV.

3. The charging management system of claim 2, wherein the processing circuit is configured to set an energy price for all of the one or more EVs equal to the predicted price $\lambda_{pred}$.

4. The charging management system of claim 1, wherein in response to the comparison indicating that the aggregate power is greater than the EV power limit $P_{LIM}$, the processing circuit is configured to:

determine a minimum charging rate $P_{min}$ to provide to all of the one or more EVs;

charge, by one or more of the EVSE or the charge controller adapter, all of the one or more EVs according to the minimum charging rate $P_{min}$;

determine a remaining amount of charging capacity, the remaining charging capacity being a difference between the EV power limit $P_{LIM}$ and an amount of power required to charge each EV of the one or more EVs according to the minimum charging rate $P_{min}$; and allocate the remaining amount of charging capacity between the one or more EVs based on the agent monetary information in the bid corresponding to each EV.

5. The charging management system of claim 4, wherein the processing circuit is configured to:

determine an energy price for the power provided; and bill all of the one or more EVs the energy price.

6. The charging management system of claim 4, wherein the processing circuit is configured to:

allocate the remaining amount of charging capacity so that an EV corresponding to the highest bid is charged, by one or more of the EVSE or the charge controller adapter associated with the EV corresponding to the highest bid, before an EV with a next highest bid is charged;

determine a first charging price for the power provided at the minimum charging rate $P_{min}$;

determine a second charging price higher than the first charging price for the remaining amount of charging capacity;

determine a rebate amount based on a difference between at a cost of the remaining amount of charging capacity at the second price and a cost of the remaining amount of charging capacity at the first price; and allocate a portion of the rebate amount to each EV of the one or more EVs that received less power than in the bids corresponding to each EV.

7. The charging management system of claim 1, wherein in response to the comparison indicating that the aggregate power demand is less than the EV power limit $P_{LIM}$, the processing circuit is configured to:

provide power, by one or more of the EVSE or the charge controller adapter, to each of the one or more EVs according to the desired charging rate $P_D$ in the bid corresponding to each EV;

determine an excess amount of power to distribute; and allocate the excess amount of power to each EV based on the agent monetary value in the bid corresponding to each EV.

8. A method of allocating charging power amongst two or more electric vehicles (EVs), comprising:

determining one or more electric vehicles (EV) are located at one or more charging sites of an EV charging network;

providing power, by a charge controller adapter coupled to each charge port associated with each EV of the one or more EVs, from an electrical power supply grid in communication with the one or more charging sites of an EV charging network;

determining, by a processing circuit of a charging management system, monetary information related to an energy price and including information indicative of a predicted price $\lambda_{pred}$;

determining, by the processing circuit, an EV power limit $P_{LIM}$ for a total amount of the one or more EVs in the EV charging network;

transmitting, by the processing circuit, the monetary information to two or more agents, each of the two or more agents associated with each EV of the two or more EVs in the EV charging network;

receiving, by the processing circuit, from each of the two or more agents, a bid including: an agent monetary value, a desired charging rate $P_D$, and a charging interval;

transmitting, to each of the two or more agents, a message including: charging interval start and end times, the amount of power to be provided during the charging interval, and the price for the charging interval; and operating, by the charge controller adapter coupled to each charge port, to provide power to each EV associated with each charge port and with the two or more agents to be charged based on each of the bids;

wherein the charge controller adapter comprises a first coupler coupled to one or more of Electric Vehicle Supply Equipment (EVSE), a second coupler coupled to each EV in the EV charging network, and an electronic circuitry electrically coupled to the first coupler and the second coupler, the electronic circuitry configured to provide power from the one or more of the EVSE, via the first coupler, to each EV in the EV charging network, via the second coupler.

9. The method of claim 8, wherein
prior to charging each EV, the method includes:
   determining, by the processing circuit, an aggregate power demand for the interval based on each of the bids;
   comparing, by the processing circuit, the aggregate power demand to the EV power limit $P_{LIM}$; and
   providing power, by one or more of the EVSE or the charge controller adapter, to each EV associated with the two or more agents to be charged based on the comparison.

10. The method of claim 9, further comprising:
determining, by the processing circuit, that the comparison indicates that the aggregate power demand is less than the EV power limit $P_{LIM}$;
providing power, by one or more of the EVSE or the charge controller adapter, to each EV of the one or more EVs according to the desired charging rate $P_D$ in the bid corresponding to each EV;
determining, by the processing circuit, an excess amount of power to distribute; and
allocating, by the processing circuit, the excess amount of power to each EV based on the agent monetary value in the bid corresponding to each EV.

11. The method of claim 9, further comprising:
determining, by the processing circuit, that the comparison indicates that the aggregate power is greater than the EV power limit $P_{LIM}$;
determining, by the processing circuit, a minimum charging rate $P_{min}$ to provide to all of the one or more EVs;
providing power, by one or more of the EVSE or the charge controller adapter, to all of the one or more EVs according to the minimum charging rate $P_{min}$;
determining, by the processing circuit, a remaining amount of charging capacity, the remaining charging capacity being a difference between the EV power limit $P_{LIM}$ and an amount of power required to charge each of the EVs according to the minimum charging rate $P_{min}$; and
allocating, by the processing circuit, the remaining amount of charging capacity between the EVs based on the agent monetary value in the bid corresponding to each EV.

12. The method of claim 11, wherein the method further comprises determining, by the processing circuit, an energy price for the power provided and billing, by a controller, all of the one or more EVs the energy price.

13. The method of claim 11, wherein the method further comprises:
   allocating, by the processing circuit, the remaining amount of charging capacity so that an EV corresponding to the highest bid is charged, by one or more of the EVSE or the charge controller adapter associated with the EV corresponding to the highest bid, before an EV with a next highest bid is charged;
   determining, by the processing circuit, a first charging price for the power provided at the minimum charging rate $P_{min}$;
   determining, by the processing circuit, a second charging price higher than the first charging price for the remaining amount of charging capacity;
   determining, by the processing circuit, a rebate amount based on a difference between at a cost of the remaining amount of charging capacity at the second price and a cost of the remaining amount of charging capacity at the first price; and
   allocating, by the processing circuit, a portion of the rebate amount to each EV of the one or more EVs that received less power than in the bids corresponding to each EV.

14. A charging management system, comprising:
a network interface configured to facilitate data communication via a network;
a memory; and
a processing circuit comprising a processor, the processing circuit configured to:
   determine monetary information related to an energy price;
   determine an electric vehicle (EV) power limit $P_{LIM}$ for a total amount of EVs in an EV charging network;
   transmit the monetary information to two or more agents, each of the two or more agents associated with an EV in the EV charging network;
   receive, from each of the two or more agents, a bid including: an agent monetary value, a desired charging rate $P_D$, and a charging interval;
   provide power, by a charge controller adapter, to the EVs associated with the two or more agents based on each of the bids;
   allocate, by the processing circuit, the remaining amount of charging capacity so that an EV corresponding to a highest bid is charged, by the charge controller adapter associated with the EV corresponding to the highest bid, before an EV with a next highest bid is charged;
   determine, by the processing circuit, a first charging price for the power provided at the minimum charging rate $P_{min}$;
   determine, by the processing circuit, a second charging price higher than the first charging price for the remaining amount of charging capacity;
   determine, by the processing circuit, a rebate amount based on a difference between at a cost of the remaining amount of charging capacity at the second price and a cost of the remaining amount of charging capacity at the first price;
   transmit to each of the two or more agents, a message including: the rebate amount; and
   allocate, by the processing circuit, a portion of the rebate amount to each of the EVs that received less power than in the bids corresponding to each of the EVs;
   wherein the charge controller adapter comprises a first coupler coupled to one or more of Electric Vehicle Supply Equipment (EVSE), a second coupler coupled to each EV in the EV charging network, and an electronic circuitry electrically coupled to the first coupler and the second coupler, the electronic circuitry configured to provide power from the one or more of the EVSE, via the first coupler, to each EV in the EV charging network, via the second coupler.

15. The charging management system of claim 14, wherein the processing circuit is configured to set an energy price for all of the EVs equal to the predicted price $\lambda_{pred}$.

16. The charging management system of claim 14, wherein the processing circuit is configured to:
   determine an energy price for the power provided; and
   bill all of the EVs the energy price.

* * * * *